(12) United States Patent
Zhang et al.

(10) Patent No.: US 6,847,422 B2
(45) Date of Patent: Jan. 25, 2005

(54) LIQUID CRYSTAL DISPLAY DEVICE AND METHOD OF MANUFACTURING THE SAME

(75) Inventors: Hongyong Zhang, Kawasaki (JP); Seii Sato, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 10/323,868

(22) Filed: Dec. 18, 2002

(65) Prior Publication Data

US 2003/0137621 A1 Jul. 24, 2003

(30) Foreign Application Priority Data

Dec. 28, 2001 (JP) ........................ 2001-401278

(51) Int. Cl.[7] ................ G02F 1/1335; G02F 1/1345; G02F 1/1339; G02F 1/136
(52) U.S. Cl. .................. 349/106; 349/43; 349/149; 349/156
(58) Field of Search ................. 349/106, 43, 149, 349/156

(56) References Cited

U.S. PATENT DOCUMENTS

| | | | |
|---|---|---|---|
| 5,032,531 A | 7/1991 | Tsutsui et al. ............ 437/40 |
| 5,777,594 A | * 7/1998 | Miyawaki ............... 345/102 |
| 5,978,061 A | * 11/1999 | Miyazaki et al. ......... 349/155 |
| 6,157,429 A | 12/2000 | Miyawaki et al. ........ 349/138 |
| 6,281,960 B1 | * 8/2001 | Kishimoto et al. ....... 349/156 |

FOREIGN PATENT DOCUMENTS

| | | |
|---|---|---|
| JP | 2-19840 | 1/1990 |
| JP | 5-11273 | 1/1993 |
| JP | 10-177181 | 6/1998 |

* cited by examiner

*Primary Examiner*—Robert H. Kim
*Assistant Examiner*—Hoan C. Nguyen
(74) *Attorney, Agent, or Firm*—Greer, Burns & Crain, Ltd.

(57) ABSTRACT

A liquid crystal display device manufacturing method, including the steps of forming first-layer metal patterns in a display portion and a peripheral circuit portion of a first substrate; forming a first insulating film on the first-layer metal patterns; forming second-layer metal patterns on the first insulating film; and forming a color resin film on the second-layer metal patterns. The method also including the steps of patterning the color resin film to form color filters made of the color resin film in a pixel region of the display portion and to leave the color resin film in the peripheral circuit portion and forming a third-layer metal pattern on the color resin film in the peripheral circuit portion.

4 Claims, 26 Drawing Sheets

LIQUID CRYSTAL DISPLAY DEVICE AND METHOD OF MANUFACTURING THE SAME

CROSS-REFERENCE TO RELATED APPLICATIONS

This application is based upon and claims priority of Japanese Patent Application No. 2001-401278, filed in Dec. 28, 2001, the contents being incorporated herein by reference.

BACKGROUND OF THE INVENTION

1. Field of the Invention

The present invention relates to a liquid crystal display device and a method of manufacturing the same and, more particularly, a liquid crystal display device in which a peripheral circuit or a signal processing circuit having CMOS field effect transistors is built and a method of manufacturing the same.

2. Description of the Prior Art

In the active-matrix liquid crystal display device in which the peripheral circuit or the signal processing circuit is built, the thin film transistors (TFTs) are employed in not only the display region but also the peripheral circuit or the signal processing circuit as the CMOS transistors in the analog switch and the inverter.

The low-temperature polysilicon technology is employed in the thin film transistors in the peripheral circuit or the signal processing circuit as well as the display region.

The low-temperature crystallizing technology is indispensable to the manufacture of the high-performance/low-cost peripheral driver circuit TFTs.

The typical crystallizing technology that is put currently to practical use is the low-temperature crystallizing method using the excimer laser. The thin film of the good-quality silicon crystal can be formed on the low-melting glass by using the excimer laser.

For example, the basic crystallizing method by using the excimer laser will be given as follows.

First, the amorphous silicon (a-Si) starting thin film is formed on the glass substrate by the thin film forming method such as PECVD (Plasma-Enhanced CVD), or the like. Then, in order to improve the laser resistivity of the starting thin film, the hydrogen in the a-Si starting thin film is removed by the annealing process at 400 to 450° C. Then, the polysilicon thin film is formed by irradiating the light beam of the excimer laser onto the a-Si starting thin film to crystallize. Then, the crystallinity is improved by processing the polysilicon thin film in the atmosphere of hydrogen, steam, or the like.

By using such polysilicon thin film, the switching TFT array is formed in the pixel display portion and also the semiconductor integrated circuit is formed in the peripheral circuit portion of the same substrate. Normally, the liquid crystal display device in which the peripheral circuit is built consists of the pixel display portion TFT array, the gate driver circuit, and the data driver circuit. Normally, the high-performance TFTs, which have the operating frequency in the range of several megahertz (MHz) to several tens megahertz, the field-effect mobility of 50 to 300 cm$^2$/Vs, and the appropriate threshold voltage Vth, are employed in the data driver circuit.

In contrast, in the gate driver circuit and the pixel display portion, the request for the mobility of the TFT is not so severe. For example, the mobility of more than 20 cm$^2$/Vs may be employed.

Meanwhile, the new technical trend of the liquid crystal display device aims at the attainment of the ultra-high definition display panel and the high-performance built-in large-scale semiconductor circuit.

First, the ultra-high definition display panel will be explained hereunder.

According to the progress of the multimedia technology and the mobile technology and the spread of the Internet, it is always required to read/process a great deal of information. For this reason, the specification requirement for the ultra-high definition displaying function is increased in the liquid crystal display device as the man-machine interface. For example, the large-size high definition display device having more than 200 dpi or the small-size ultra-high definition liquid crystal display device for the mobile device is needed in the application fields such as the multi-screen display of the homepage of the Internet, the multitask process, the CAD design, etc.

Next, the high-performance liquid crystal panel built-in type large-scale semiconductor circuit will be explained hereunder.

In the low-temperature polysilicon integral panel, there appears the technical trend that attains the intelligent panel or the sheet computer by providing the high-performance large-scale semiconductor integrated circuits in the peripheral circuit portion. For example, it is possible to build the digital driver, the data processing circuit, the memory array, the interface circuit, and the CPU in the liquid crystal display panel on the data side.

The normal thin film transistors are used as the active elements being employed in such peripheral circuit portion. As set forth in Patent Application Publication (KOKAI) 2000-36599, for example, respective thin film transistors in the peripheral circuit portion and the pixel portion are formed by the same steps, and also the wirings formed on these thin film transistors are formed by the same steps.

For instance, as shown in FIG. 1, the thin film transistor 101 in the display portion A and the thin film transistor 102 in the peripheral circuit portion B are formed simultaneously on one substrate 103, and then these thin film transistors 101, 102 are covered with the first interlayer insulating film 104. Here, the polysilicon film 100 constituting the thin film transistors 101, 102 is formed by patterning the low-temperature polysilicon film described above. The gate insulating film 110 is formed between the polysilicon film 100 and the gate electrodes 101g, 102g. In this case, the gate electrodes 101g, 102g are formed simultaneously with the first-layer wiring (not shown).

In addition, the second-layer wiring 105, the second interlayer insulating film 106, the third-layer wiring 107, and the third interlayer insulating film 108 are formed sequentially on the first interlayer insulating film 104. The second-layer wiring 105 is connected to the thin film transistors 101, 102 in the display portion A and the peripheral circuit portion B via the holes formed in the first interlayer insulating film 104 respectively. The third-layer wiring 107 is connected to the thin film transistor 102 in the peripheral circuit portion B via the hole formed in the second interlayer insulating film 106. The metal constituting the second-layer wiring 105 is employed as the black matrix BM in the display portion A. Also, the pixel electrode 109 is formed on the third interlayer insulating film 108 in the display portion A, and this pixel electrode 109 is connected to the source region of the thin film transistor 101 via the second-layer wiring 105

By the way, in the liquid crystal display panel, with the progress of the high definition display, the pixel pitch is reduced and also the peripheral circuit density is extremely increased. Therefore, the ultra high definition display panel in which the digital driver is built and which has 200 dpi or more must be formed.

For example, in the case of the 8.4 type UXGA panel, the numbers of pixels is 1600 (horizontal direction)×3×1200 (vertical direction), the display definition is 238 dpi, and the sub-pixel pitch is 35.5 μm. As another example, in the case of the 15 type QXGA panel, the numbers of pixels is 2048 (horizontal direction)×3×1536 (vertical direction), the display definition is 171 dpi, and the sub-pixel pitch is 49.5 μm.

In order to drive the pixel column of such vertical one line, the peripheral circuit consisting of hundreds to several thousands of TFTs must be installed in such narrow pixel pitch region. Also, in order to manufacture the high-performance low-temperature polysilicon intelligent panel, the sheet computer, etc., the large-scale circuits such as the digital driver, the data processing circuit, the memory array, the interface circuit, the CPU, etc. must be built in the peripheral circuit region.

However, in the multi-layered wiring structure shown in FIG. 1, even if the higher integration and the narrower wiring pitch in the peripheral circuit can be attained, the parasitic capacitance between the vertical wirings disturbs the high-speed operation in the peripheral circuit region because the wiring interval in the vertical direction is set narrower than the wiring interval in the lateral direction.

SUMMARY OF THE INVENTION

It is an object of the present invention to provide a liquid crystal display device capable of lowering the capacitance between wirings, and a method of manufacturing the same.

According to the liquid crystal display device of the present invention, the color resin film constituting the color filters formed in the display portion is also left in the peripheral circuit portion.

Therefore, the parasitic capacitance between upper and lower conductive patterns can be reduced by the color resin in the peripheral circuit portion.

In addition, since the color resin film is left in not only the display portion but also the peripheral circuit portion, the difference between the gap between the first substrate and the second substrate in the peripheral circuit portion and the gap between the first substrate and the second substrate in the display portion can be reduced.

If the color resin film is removed from the peripheral circuit portion, the gap in the peripheral circuit portion becomes larger than the gap in the display portion and thus an amount of wasteful liquid crystal, through which the light cannot be transmitted, in the peripheral circuit portion is increased. However, in the present invention, since the difference between the gap in the peripheral circuit portion and the gap in the display portion can be made small, the waste of the liquid crystal can be reduced by reducing an amount of supply of the liquid crystal into the peripheral circuit portion.

Further, the color resin film in the peripheral circuit portion can be formed by leaving as it is the color resin film employed as the color filters. Therefore, the addition of new steps is not needed and thus the reduction in throughput can be avoided.

DESCRIPTION OF THE PREFERRED EMBODIMENTS

Embodiments of the present invention will be explained with reference to the accompanying drawings hereinafter.

(First Embodiment)

Figure 1:
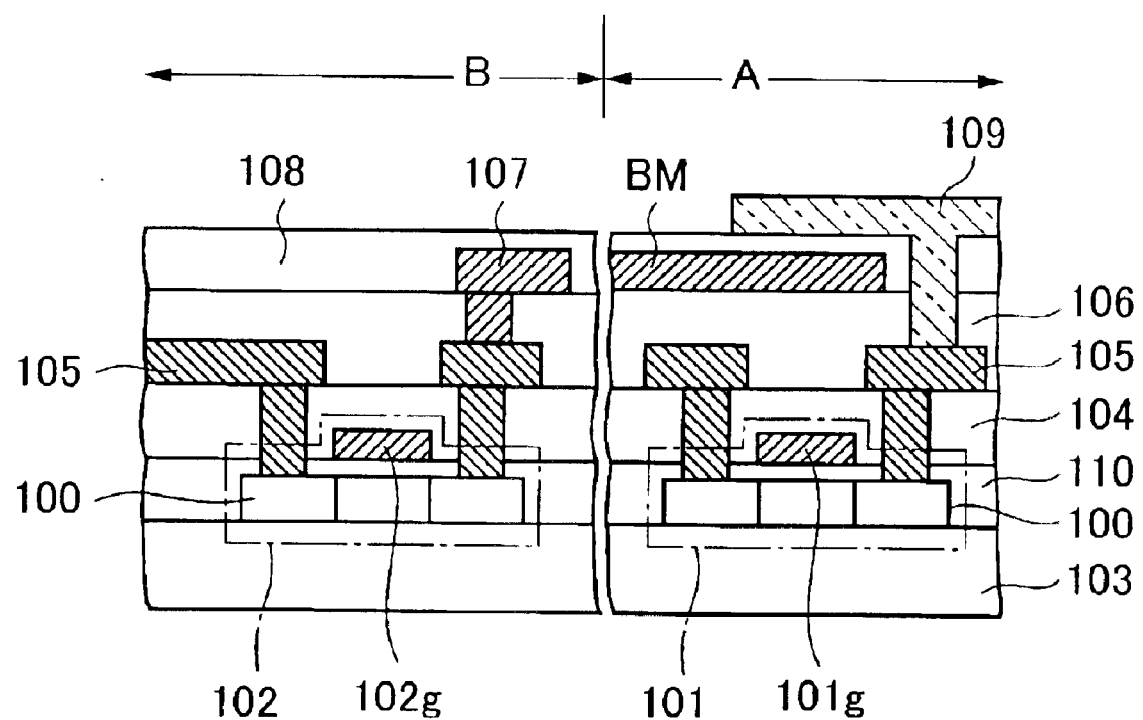
FIG. 1 is a sectional view showing the TFT substrate of the liquid crystal display device in the prior art.
Figure 2A:
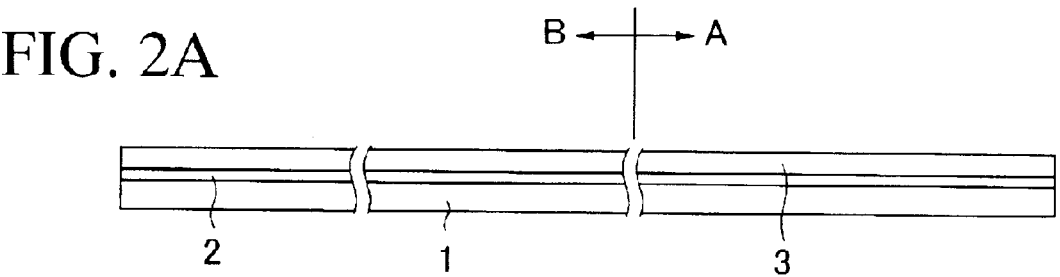
FIGS. 2A to 2W are sectional views showing steps of manufacturing a TFT substrate of a liquid crystal display device according to a first embodiment of the present invention.
Figure 2B:
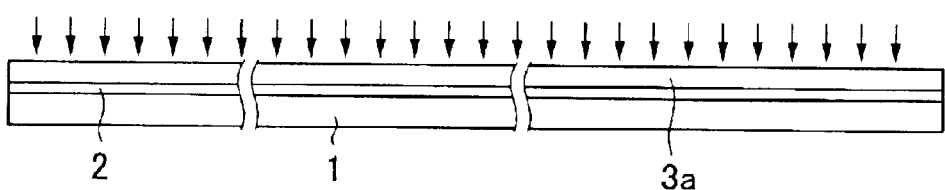
Figure 2C:
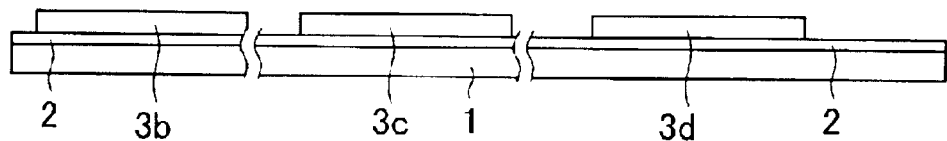
Figure 2D:
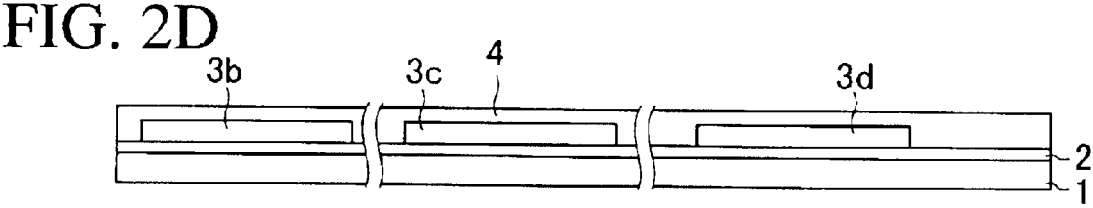
Figure 2E:
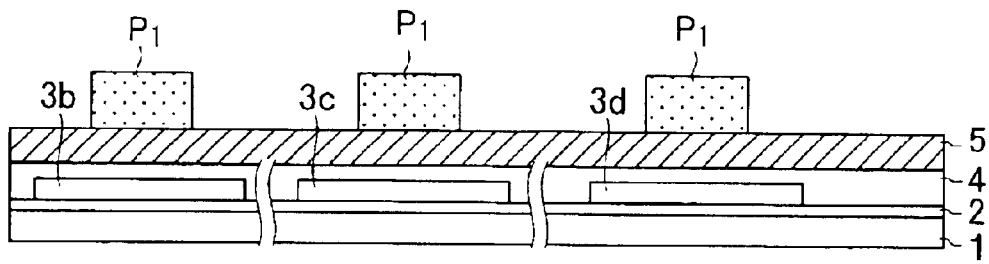
Figure 2F:
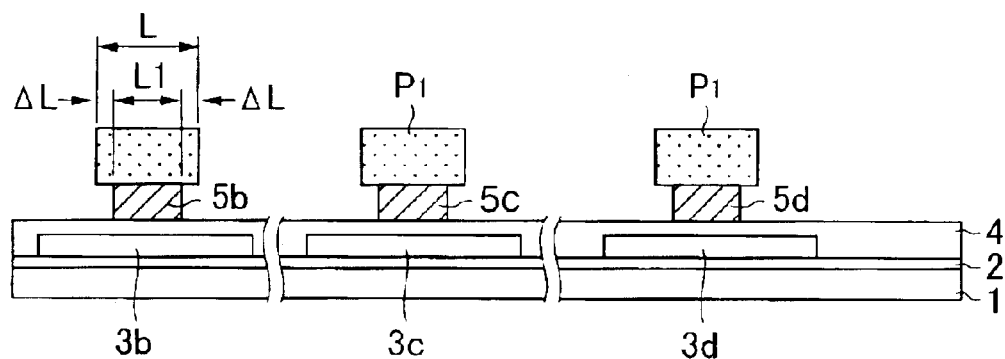
Figure 2G:
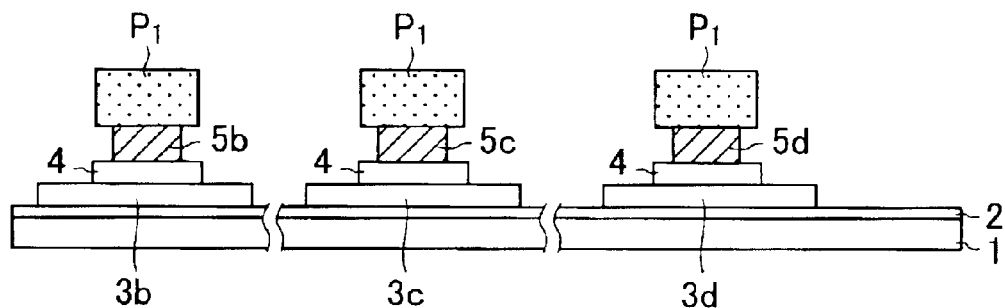
Figure 2H:
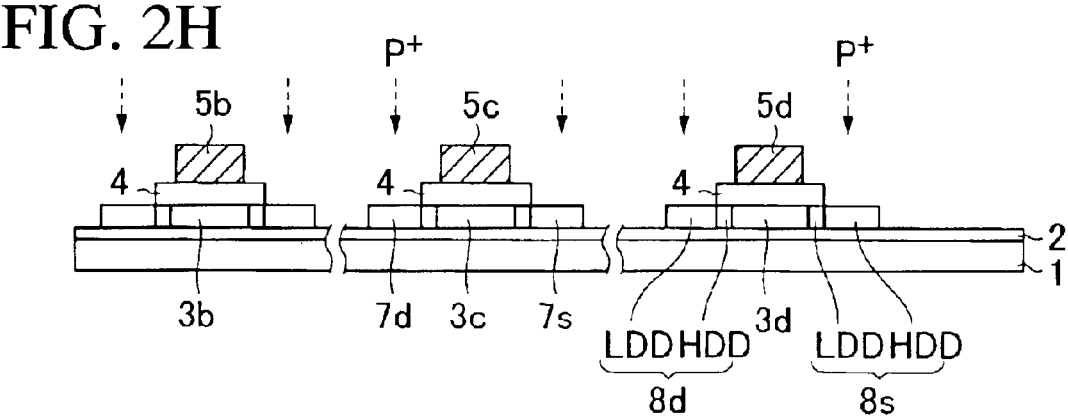
Figure 2I:
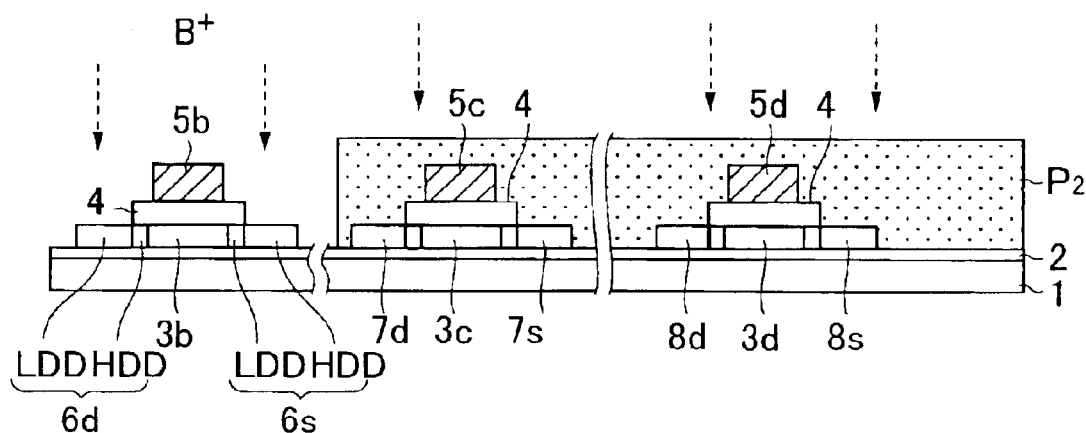
Figure 2J:
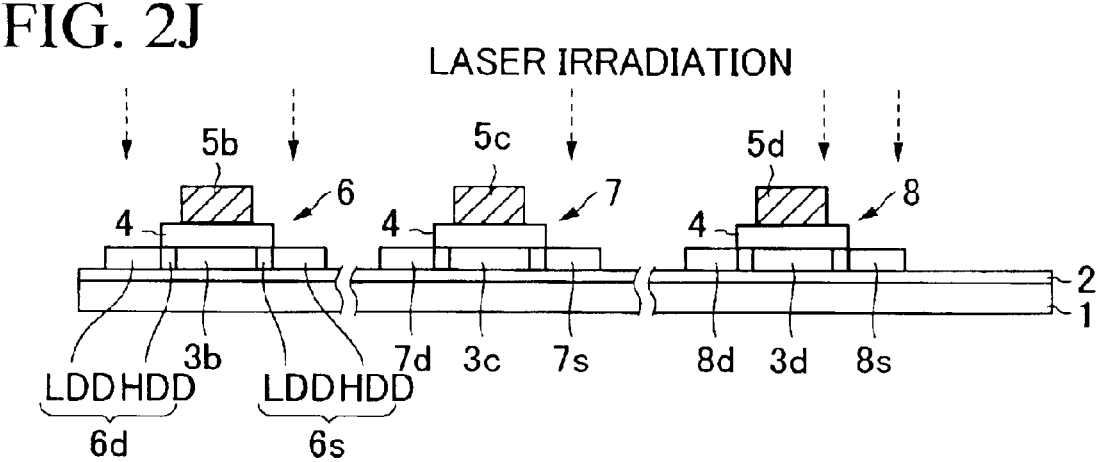
Figure 2K:
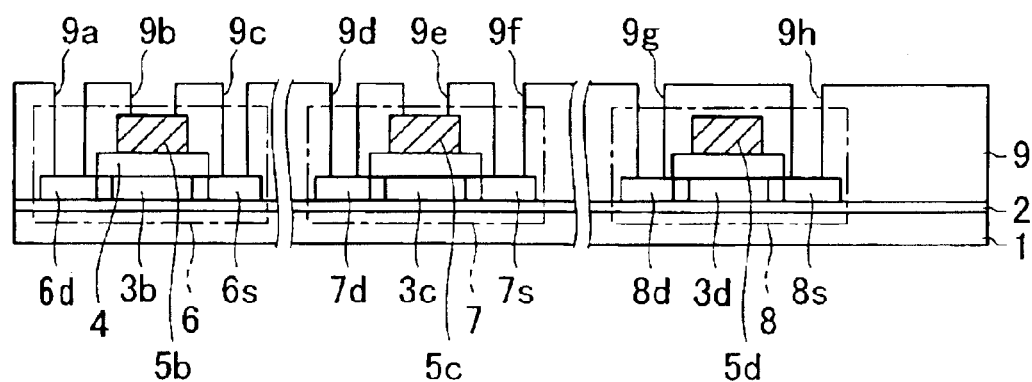
Figure 2L:
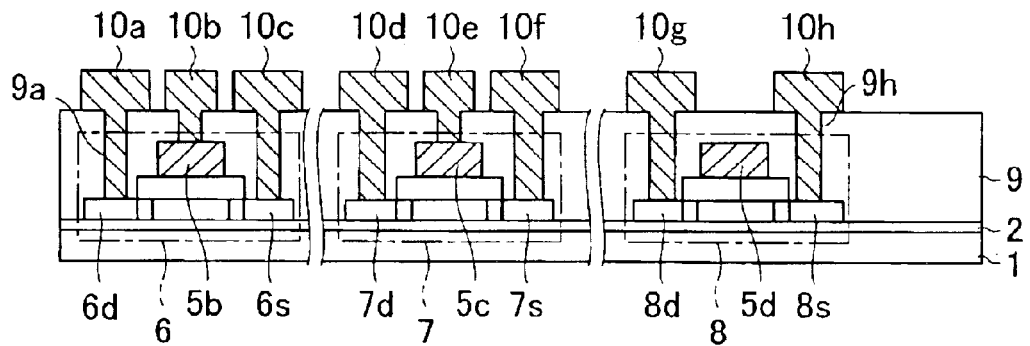
Figure 2M:
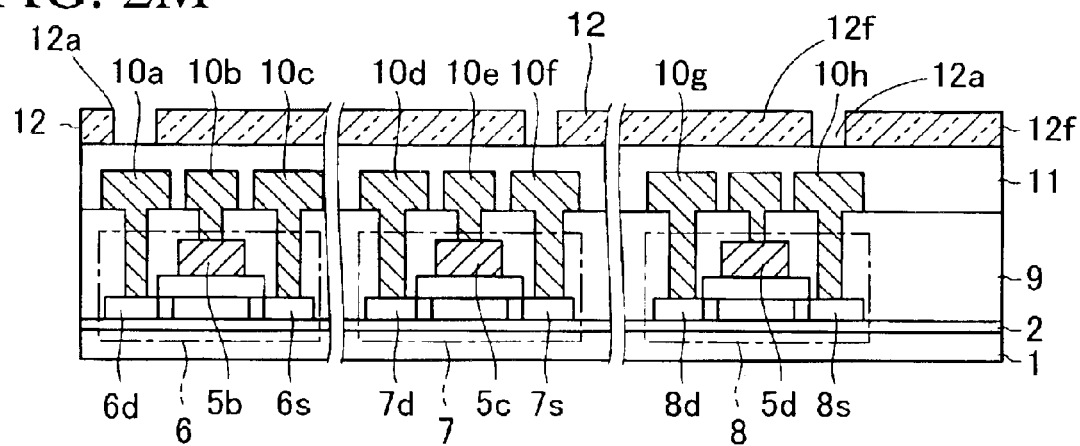
Figure 2N:
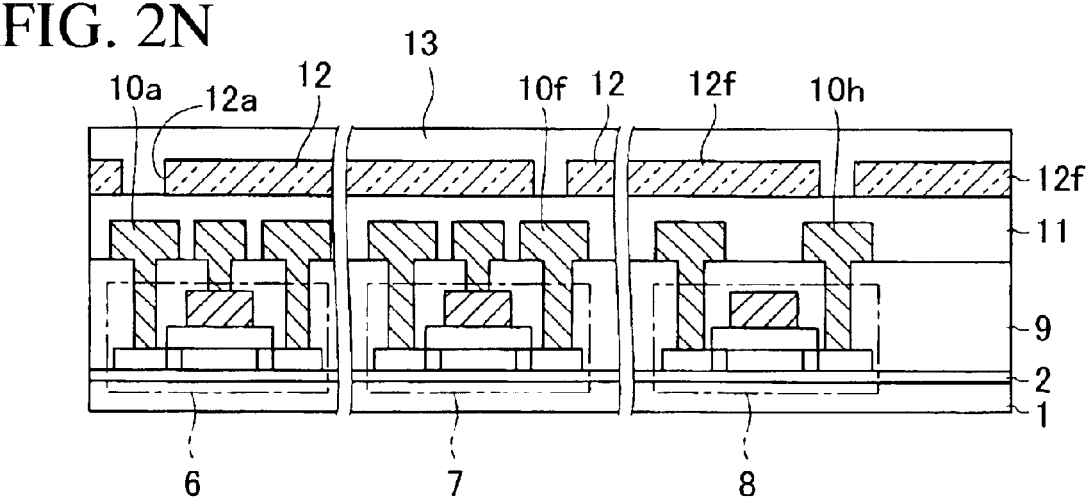
Figure 2O:
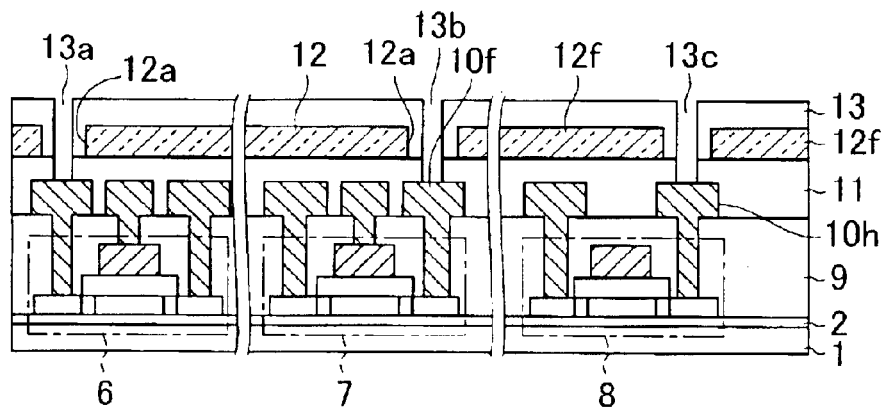
Figure 2P:
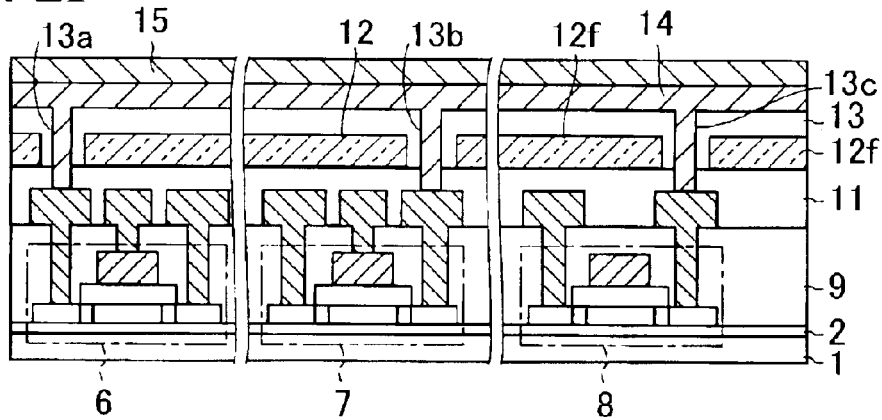
Figure 2Q:
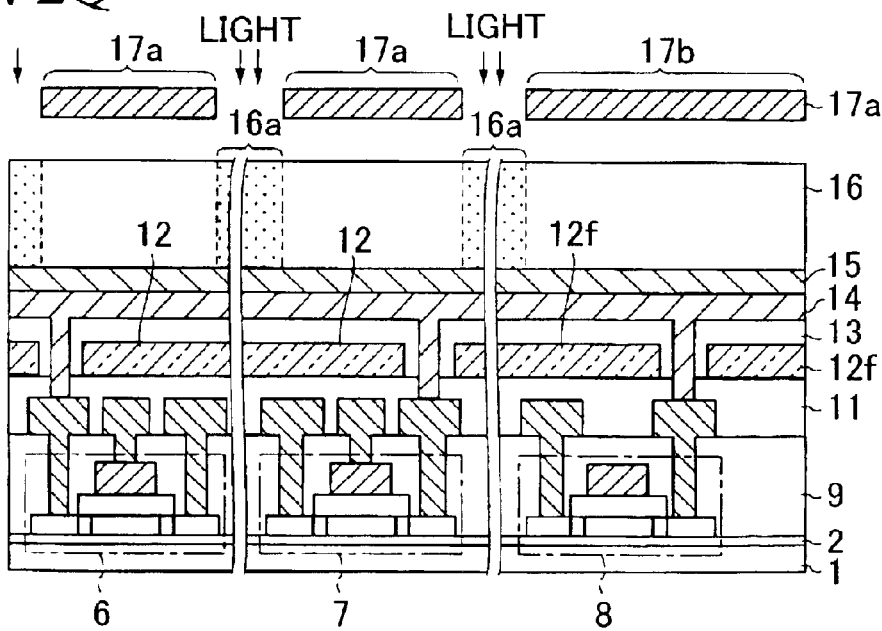
Figure 2R:
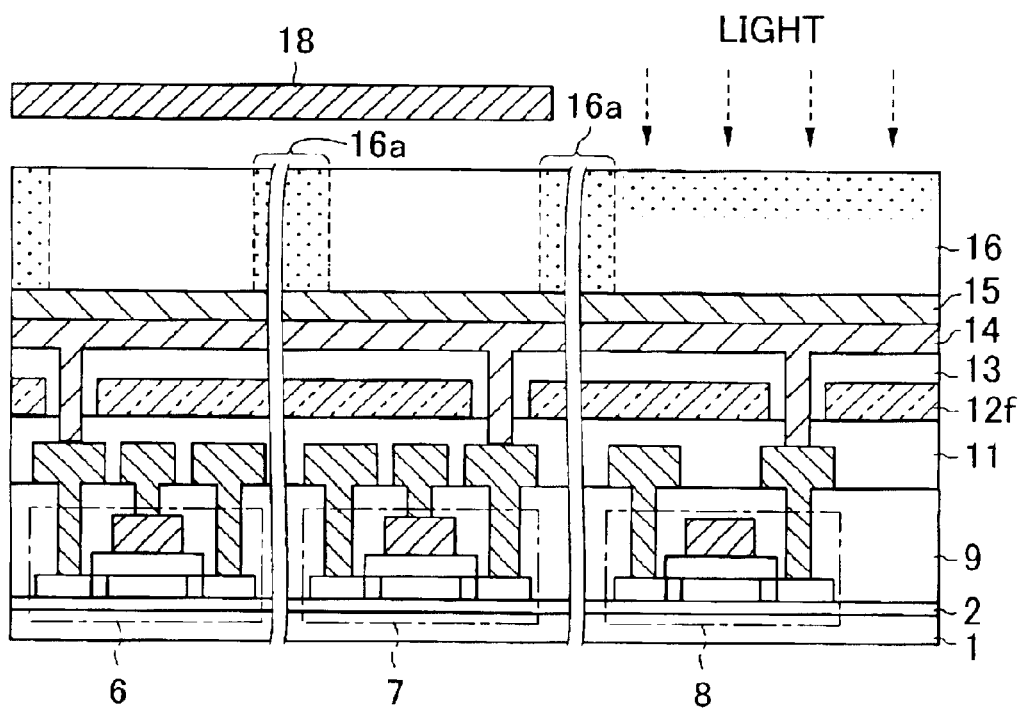
Figure 2S:
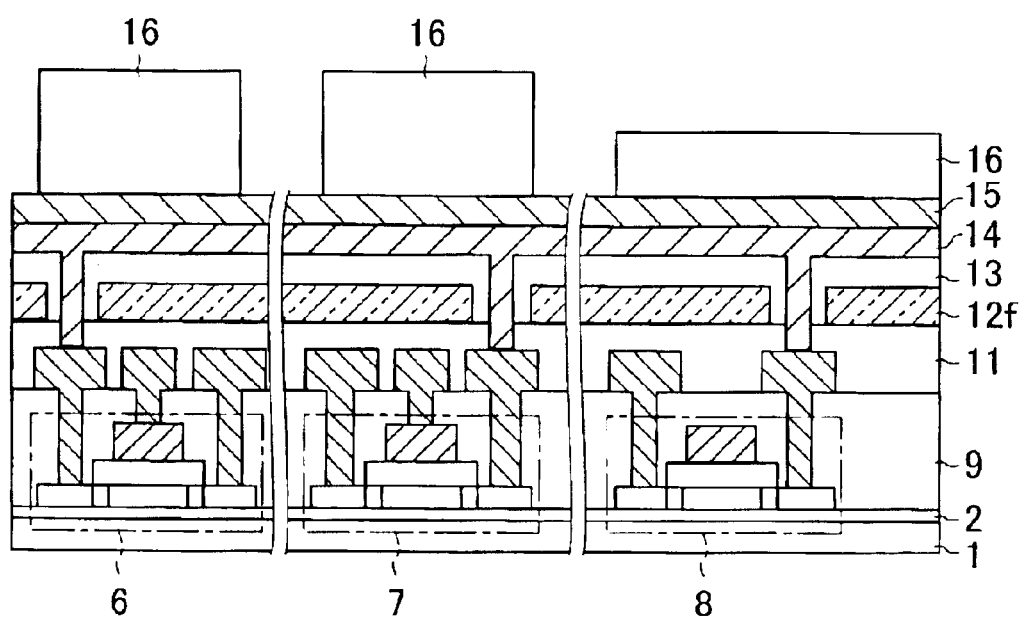
Figure 2T:
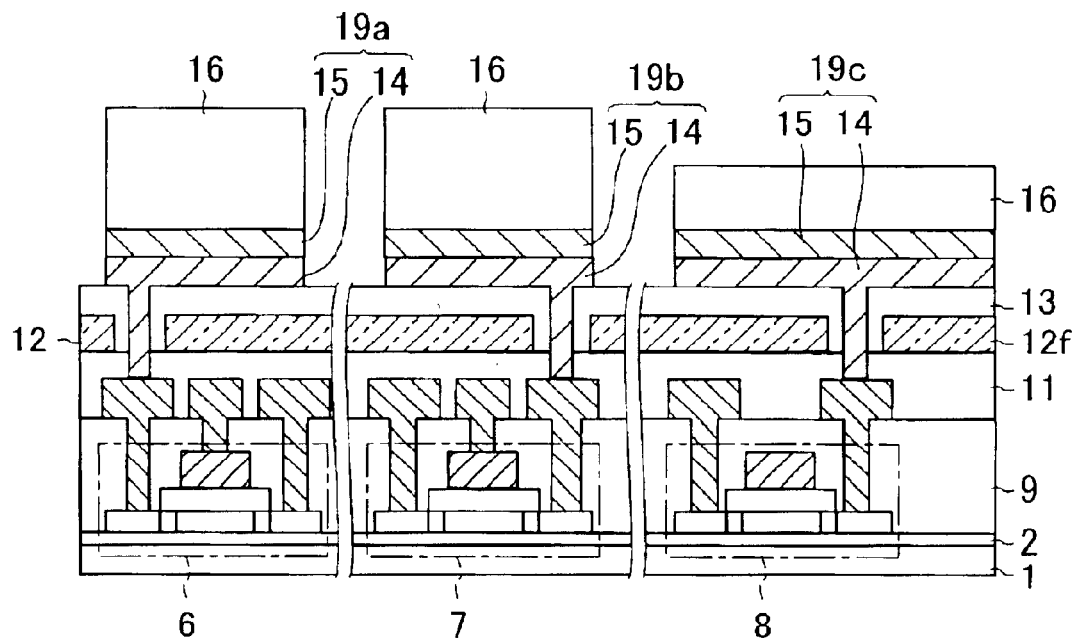
Figure 2U:
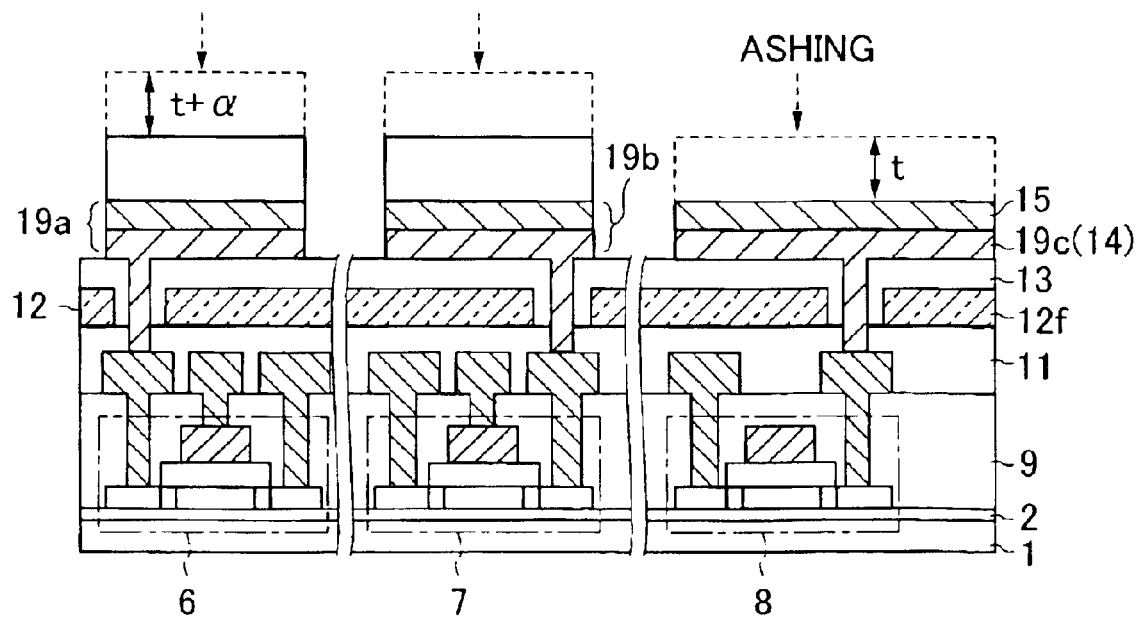
Figure 2V:
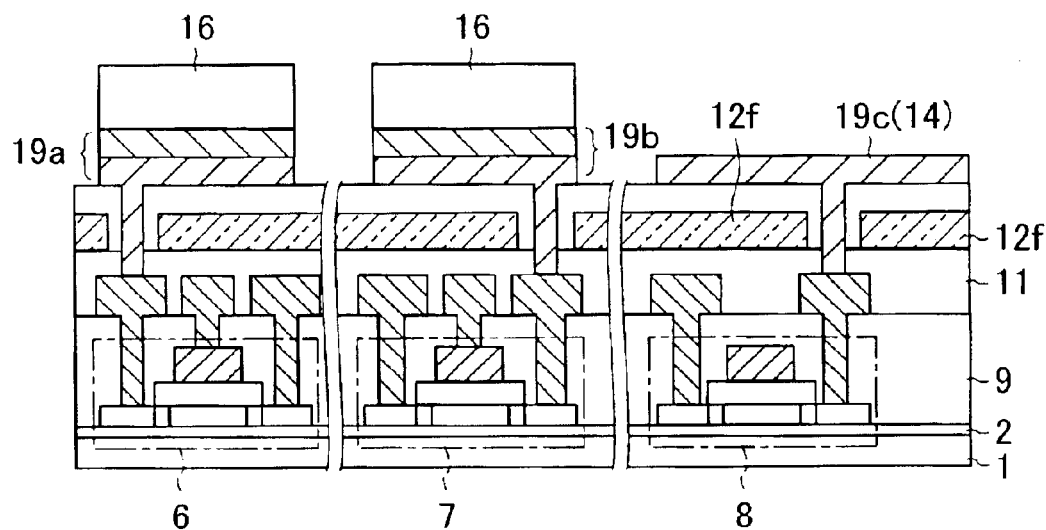
Figure 2W:
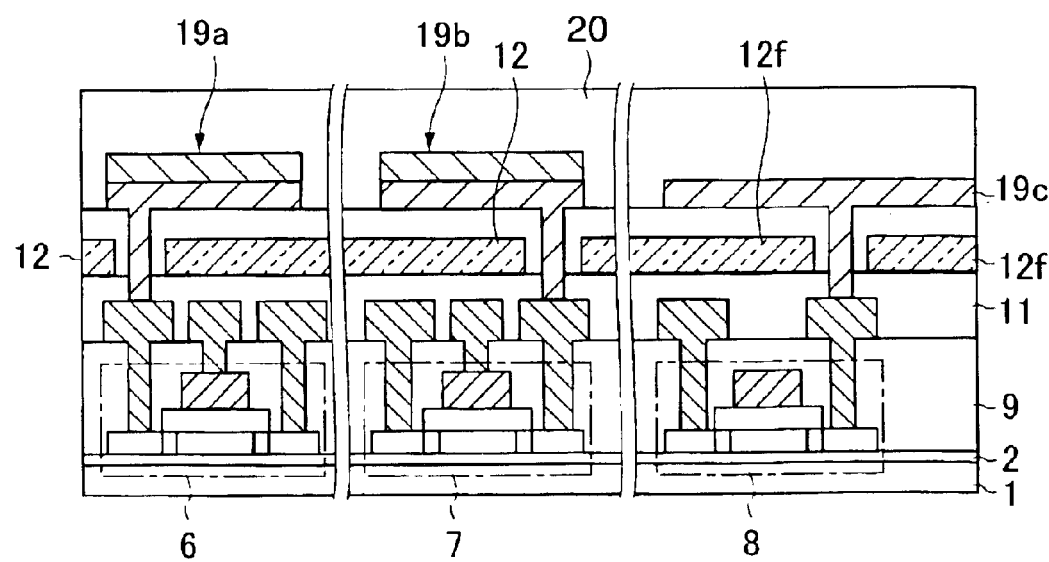

FIGS. 2A to 2W are sectional views showing steps of forming a thin film transistor (TFT) in a liquid crystal display device according to a first embodiment of the present invention.

First, as shown in FIG. 2A, a silicon oxide ($SiO_2$) film is formed as an underlying insulating film 2 on an insulating substrate 1 made of glass, quartz, resin film, or the like to have a thickness of 150 to 300 nm, preferably 200 nm. The underlying insulating film 2 may be formed as the double-layered structure in which a silicon nitride film of 50 nm thickness and a silicon oxide film of 200 nm thickness are formed sequentially. In this case, the #1737 glass substrate manufactured by Corning Co., for example, may be employed as the insulating substrate 1.

Then, an amorphous silicon film 3 is formed on the underlying insulating film 2 to have a thickness of 20 to 100 nm, preferably 40 to 50 nm. This film is formed continuously from the underlying insulating film 2 by the PECVD (Plasma-Enhanced CVD) method, for example. In addition, the insulating substrate 1 is put in the nitrogen atmosphere and then the amorphous silicon film 3 is annealed at the temperature of 450° C. for one hour, so that the hydrogen is removed from the amorphous silicon film 3.

Then, as shown in FIG. 2B, the amorphous silicon film 3 is changed into a polysilicon film 3a by irradiating the excimer laser, which has the wavelength of 308 nm and the energy density of 300 to 400 mJ/cm$^2$, preferably 320 to 350 mJ/cm$^2$, onto the overall surface of the amorphous silicon film 3.

In this case, if the amorphous silicon film 3 is not an amorphous-silicon hydride (a-Si:H) but a low-hydrogen density amorphous silicon (a-Si), the annealing step of removing the hydrogen from the silicon film is not needed. The low-hydrogen density amorphous silicon is the amorphous silicon having an amount of contained hydrogen of less than 1%, for example.

Then, as shown in FIG. 2C, island-like polysilicon patterns 3b, 3c, 3d are formed in a plurality of transistor forming regions of the pixel portion A, the peripheral circuit portion B, and other circuit portions (not shown) respectively by patterning the polysilicon film 3a by using the resist (not shown) and the reactive ion etching.

Then, as shown in FIG. 2D, an SiO$_2$ film of 40 to 150 nm thickness is formed as a gate insulating film 4 on the underlying insulating film 2 and the island-like polysilicon patterns 3b, 3c, 3d by the PECVD method. As the material gas to grow the SiO$_2$ film, SiH$_4$ and N$_2$O are employed. In this case, the thickness of the SiO$_2$ film is set to 100 to 150 nm when the power supply voltage supplied to the liquid crystal display device is 16 to 18 V, and set to 40 to 80 nm when the power supply voltage supplied to the liquid crystal display device is 8 to 10 V, and set to 20 to 60 nm when the power supply voltage supplied to the liquid crystal display device is 3.3 to 5 V.

In this case, a double-layered structure in which a silicon oxide (SiO$_2$) film having a thickness of 100 to 150 nm, preferably 120 nm and a silicon nitride (SIN$_x$) film having a thickness of 30 to 100 nm, preferably 40 to 50 nm are formed continuously by the PECVD method, for example, may be employed as the gate insulating film 4.

Then, as shown in FIG. 2E, an aluminum alloy (metal), e.g., Al—Nd or Al—Sc, is formed on the gate insulating film 4 by the sputter method to have a thickness of 300 to 500 nm, preferably 350 nm. This aluminum alloy is a first-layer metal later (first metal layer) 5. Then, resist patterns P$_1$ having a gate electrode shape are formed on the first metal layer 5. A width of the gate portion of the resist pattern P$_1$ is set to L.

Then, the first-layer metal later 5 is patterned by the photolithography method while using the resist patterns P$_1$ as a mask. Thus, as shown in FIG. 2F, gate electrodes 5b, 5c, 5d, which pass over the island-like polysilicon patterns 3b, 3c, 3d, and other first-layer wiring patterns are formed.

Then, in order to assure a low impurity concentration regions (LDD regions) described later, the gate electrodes 5b, 5c, 5d are narrowed rather than the resist patterns P$_1$ by applying the wet etching (isotropic etching) to the gate electrodes 5b, 5c, 5d. Thus, a width of the gate electrodes 5b, 5c, 5d is set to L$_1$ (L$_1$<L).

Accordingly, the LDD regions having a width ΔL can be assured on both sides of the gate electrodes 5b, 5c, 5d. Ordinarily, in order to assure the reliability of the TFT, the LDD region width is controlled in the range of 0.5 to 1.5 μm. In the present embodiment, as shown in FIG. 2F, the width ΔL of the LDD regions is controlled smaller than 0.8 μm by adjusting the side etching time. It is of course that, if the side etching time is adjusted, the width ΔL can be adjusted arbitrarily in the range of 0.5 to 1.5 μm.

In this case, the LDD regions may be formed by the wet etching after the first metal layer 5 is etched by the anisotropic etching such as the RIE method, or the like.

Then, as shown in FIG. 2G, the gate insulating film 4 is etched by the RIE method while using the resist patterns P$_1$ as a mask. In this case, in order to set the selective etching ratio of SiO$_2$ constituting the gate insulating film 4 to the polysilicon patterns 3b, 3c, 3d to a ratio of SiO$_2$/Si=10/1, a carbon-containing gas such as CHF$_3$, or the like is employed as the etching gas. According to this, since the gate insulating film 4 is etched in the vertical direction to have the almost same shape as the resist patterns P$_1$, stepped regions having the width ΔL on both sides of the gate electrodes 5b, 5c, 5d appear in the pattern of the gate insulating film 4 in a self-alignment manner. A height of the stepped portion is identical to a thickness of the SiO$_2$ film constituting the gate insulating film 4.

Then, as shown in FIG. 2H, the resist patterns P$_1$ left on the gate electrodes 5b, 5c, 5d are peeled off.

Then, the phosphorous ion is doped into the island-like polysilicon patterns 3b, 3c, 3d on both sides of the gate electrodes 5b, 5c, 5d.

The doping of the impurity is executed in the range of the overall surface of the insulating substrate 1 by using the plasma doping equipment having the ion source in the RF discharging system or the DC discharging system. Such doping is the ion implantation of the phosphorus ion (P$^+$) into the polysilicon patterns 3b, 3c, 3d executed by two-step method. As the gas for supplying the phosphorus, phosphine (PH3) that is diluted into 1 to 5% is employed.

The n-type low-impurity concentration regions (LDD regions or n$^-$ regions) are formed by the high ion acceleration voltage in the first step, while the n-type high-impurity concentration regions (HDD regions or n$^+$ regions) are formed by the low ion acceleration voltage in the second step. In this case, the impurity implanted by the high ion acceleration voltage is passed through the gate insulating film 4 and forms the LDD regions of the low impurity concentration in the underlying polysilicon patterns 3b, 3c, 3d. Also, the impurity implanted by the low ion acceleration voltage is seldom passed through the gate insulating film 4 and forms the HDD regions of the high impurity concentration in regions that are exposed from the side of the gate insulating film 4.

In the typical conditions of the first step doping, the ion acceleration voltage is set to 70 keV and a dosage of phosphorus is set to 5×10$^{12}$ to 5×10$^{14}$ ions/cm$^2$. In the typical conditions of the second step doping, the ion acceleration voltage is set to 10 keV and a dosage of phosphorus is set to 5×10$^{14}$ to 1×10$^{15}$ ions/cm$^2$. In this case, the acceleration voltage in the LDD regions must be adjusted according to the thickness of the gate insulating film 4. For example, if the gate insulating film 4 is 40 to 60 nm, the doping acceleration voltage in the LDD regions is adjusted to 30 to 40 keV. The maximum merit of two-step doping method is that the HDD regions and the LDD regions can be formed by one doping step in a self-alignment manner not to release a vacuum.

Now, the forming sequence of the LDD regions and the HDD regions may be reversed.

The above doping is applied to the island-like polysilicon patterns 3b, 3c, which constitute a p-type TFT 6 forming region and an n-type TFT 7 forming region in the peripheral circuit portion B, and the island-like polysilicon pattern 3d, which constitutes an n-type TFT 8 forming region in the pixel portion A. Therefore, the inversion doping must be applied to invert the $n^+$-type of source/drain regions 6s, 6d of the p-type TFT 6 into the $p^+$-type and also invert the $n^-$-type into the $p^-$-type after the above doping.

Then, as shown in FIG. 2I, in the situation that the n-type TFTs 7, 8 are covered with the photoresist $P_2$, two-step boron ($B^+$) doping is applied to the p-type TFT 6 by using the plasma doping equipment having the ion source of the RF or DC discharging system. The $B^+$ doping in the first step and the second step of the inversion doping intends to form the low-resistance HDD regions ($p^+$ regions) in the source region 6s and the drain region 6d respectively and to form the relatively high-resistance LDD regions ($p^-$ regions) in the portions of the source/drain regions 6s, 6d near the gate electrode 5b. In the typical conditions of the first step doping of the inversion doping to form the HDD regions, the ion acceleration voltage is set to 10 keV and a dosage of boron is set to $5\times10^{14}$ to $5\times10^{15}$ ions/cm$^2$. In the typical conditions of the second step doping of the inversion doping to form the LDD regions, the ion acceleration voltage is set to 60 keV and a dosage of boron is set to $5\times10^{12}$ to $1\times10^{14}$ ions/cm$^2$.

Now, the forming sequence of the LDD regions and the HDD regions may be reversed.

Then, the photoresist $P_2$ used in the inversion doping is peeled off.

Then, as shown in FIG. 2J, the activation of the dopant is carried out by the excimer laser method that has the wavelength of 308 nm and the energy density of 250 to 300 mJ/cm$_2$ or the lamp heating method using the halogen lamp, or the like, so that the sheet resistance of the source regions 6s, 7s, 8s and the drain regions 6d, 7d, 8d is set to less than 5 kΩ, preferably less than 1 kΩ, and the sheet resistance of the LDD regions is set to $1\times10^4$ to $5\times10^6$ Ω/□, preferably $5\times10^4$ to $1\times10^5$ Ω/□. In this case, in order to improve the activation efficiency, the thermal activating step executed at 300 to 600° C. may be added prior to or after the laser activation step.

With the above, the formation of the p-type TFT and the n-type TFT is completed. In this case, in the present embodiment, the n-type TFT 8 is formed in the display portion A and also the n-type TFT 6 and the p-type TFT 7 are formed in the peripheral circuit portion B. But the formation is not limited to them.

Then, steps required until a structure shown in FIG. 2K is formed will be explained hereunder.

First, a silicon oxide (SiO$_2$) film of 60 nm thickness is formed on the gate insulating film 4 and the gate electrodes 5b, 5c, 5d by using the PECVD method. Then, a silicon nitride (SiN$_x$) film is formed on this SiO$_2$ film to have a thickness of 300 to 600 nm, preferably 400 nm. The double-layered insulating film consisting of the SiO$_2$ film and the SiN$_x$ film is used as a first interlayer insulating film 9.

Accordingly, the TFTs 6, 7, 8 are brought into the state that they are covered with the first interlayer insulating film 9. In this case, one of the silicon nitride film and the silicon oxide film may be formed as the first interlayer insulating film 9.

Then, silicon oxide (SiO$_2$) film is patterned by the RIE method and the photolithography method using the resist patterns. Thus, contact holes 9a to 9f are formed on the source regions 6s, 7s and the drain regions 6d, 7d and the gate electrodes 5b, 5c of the n-type TFT 7 and the p-type TFT 6 being formed in the peripheral circuit region B respectively, and at the same time contact holes 9g, 9h are formed on the source region 8s and the drain region 8d of the n-type TFT 8 in the display portion A respectively. In this case, the gate electrode 5d in the display portion A is connected to a gate bus line as the first-layer wiring (not shown).

In this patterning step, the mixed gas of CF$_4$, SF$_6$, O$_2$, etc. is used as the etching gas for the SiN$_x$ film constituting the first interlayer insulating film 9, and also CHF$_3$ is used as the etching gas for the SiO$_2$ film.

The resist pattern (not shown) is removed, and then the natural oxide film in the contact holes 9a to 9h is removed by the 1% diluted hydrofluoric acid.

Then, as shown in FIG. 2L, a multi-layered metal film is formed in all contact holes 9a to 9h and on the first interlayer insulating film 9 by the sputter method. As the multi-layered metal film, there is the triple-layered structure in which a Ti film of 50 nm thickness, an Al film of 200 nm thickness, and a Ti film of 100 nm thickness, for example, are formed sequentially continuously not to release the vacuum. This multi-layered metal film is a second-layer metal layer (second metal layer).

Then, wiring patterns 10a to 10h that are extended from the source regions 6s, 7s, 8s, the drain regions 6d, 7d, 8d, and the gate electrodes 5b, 5c via the contact holes 9a to 9h are formed by patterning the multi-layered metal film by the photolithography method. The RIE method is used to etch in the photolithography method, and a chlorine etching gas is used as the etching gas for the Ti/Al/Ti multi-layered metal film (second-layer metal layer). The wiring pattern 10g, which is connected electrically to the drain region 8d of the TFT 8 and the drain bus line (not shown), and the wiring pattern 10h, which is connected to the source region 8s of the TFT 8 to extend upwardly, are formed on the first interlayer insulating film 9 in the display portion A.

The wiring patterns 10a to 10h formed on the first interlayer insulating film 9 are the second-layer wiring patterns.

Next, steps required until a structure shown in FIG. 2M is formed will be explained hereunder.

First, a silicon nitride film (SiN$_x$) 11 for covering the second-layer wiring patterns 10a to 10h is formed on the first interlayer insulating film 9 by the PECVD method to have a thickness of 50 to 200 nm, preferably 100 nm. This silicon nitride film 11 is an inorganic insulating film and is an example of a second interlayer insulating film. In this case, if there is no trouble in the long-term reliability of the TFTs 6, 7, 8, the formation of the silicon nitride film 11 can be omitted.

Then, a photosensitive color (coloring) resin film 12 is coated on the silicon nitride film 11, and then color filters 12f are formed by exposing/developing this resin film.

The color filters 12f have a red coloring region, a green coloring region, and a blue coloring region. That is, the color filters 12f are formed in the pixel portion of the display portion A by coating/exposing/developing sequentially a plurality of photosensitive color resin films 12 containing the red (R), green (G), or blue (B) pigment. In this case, the color filters 12f for respective colors in the display portion A consist of the first-layer color resin film 12. In addition, the first-layer color resin film 12 is left in the peripheral circuit portion B. A color filter 12r colored in red, a color filter 12g colored in green, and a color filter 12b colored in blue are arranged adjacently mutually or are arranged sequentially in one direction.

In this case, since the contact portions are present on the predetermined second-layer wiring patterns 10a, 10f, 10h in the display portion A and the peripheral circuit portion B, cavity contact regions 12a are formed previously in the color resin film 12 by removing the color resin film 12 from the contact portions and their peripheral areas.

A thickness of the color resin film 12 may be adjusted in the range of 0.5 to 4 μm in response to the pigment density. It is preferable that, the higher the density becomes, the thinner the thickness should be formed. In the present embodiment, the thickness of the color resin film 12 is set to 1.3 μm.

Also, since a contained amount of the metal impurity that is harmful to the TFT element is different according to the type of the pigment in the color resin film 12, it is preferable that the color resin film containing a smaller amount of the metal impurity should be left in the peripheral circuit portion B. For example, out of the red pigment, the green pigment, and the blue pigment, the red pigment contains the smallest amount of the metal impurity and the blue pigment contains the largest amount of the metal impurity.

Also, out of the red, green, and blue color resin films, the red color resin film has the good adhesiveness to the silicon nitride film 11 and the inorganic insulating film. Thus, the red color resin film is preferable as the color resin film 12 being left in the peripheral circuit portion B.

Then, as shown in FIG. 2N, a photosensitive planarizing resin film 13 made of photosensitive polyimide, acryl, etc. is formed on the color resin film 12, the color filters 12f, and the silicon nitride film 11. This planarizing resin film 13 is a transmissive resin film and is formed preferably to have a thickness of 3 to 4 μm. In the present embodiment, a positive photosensitive acrylic resin film of 3.0 μm thickness is formed as the planarizing resin film 13.

Then, as shown in FIG. 2O, holes 13a, 13b, 13c are formed in the planarizing resin film 13 by exposing/developing the photosensitive planarizing resin film 13. For example, a hole 13c is formed on the contact portion of the second-layer wiring pattern 10h that is connected electrically to the source region 8s of the TFT 8 in the display portion A, and simultaneously holes 13a, 13b are formed on the contact portions of the second-layer wiring patterns 10a, 10f that are connected electrically to the source region 7s, the draing region 6d, etc. of the TFTs 6, 7 in the peripheral circuit portion B. These holes 13a, 13b, 13c are formed to pass through the holes 12a being formed in the color resin film 12.

Then, the underlying silicon nitride film 11 is etched via the holes in the planarizing resin film 13. In this case, ratios of CF$_4$, SF$_6$, and O$_2$ employed as the etching gas for the silicon nitride film 11 are controlled to adjust the etching rate of the silicon nitride film 11 to the planarizing resin film 13.

Here, when the silicon nitride film 11 is etched by using the planarizing resin film 13 as a mask, the etching of the color resin film is not needed to form the holes 13a, 13b in the silicon nitride film 11 since the color resin film in the display portion A and the peripheral circuit portion B has already been removed from the region in which the holes 13a, 13b are to be formed.

Then, as shown in FIG. 2P, an ITO (transparent conductive film) film 14 of 70 nm thickness, a titanium film of 50 nm thickness, and an aluminum film of 200 nm thickness are formed continuously on the planarizing resin film 13 and in the holes 13a to 13c by the sputter method. The Ti film and the Al film constitutes a third-layer metal film 15. This Ti film is formed as an intermediate metal blocking film to prevent the electrolytic corrosion due to the direct contact of the ITO film 14 and the Al film. In this case, a molybdenum film may be formed as the intermediate metal blocking film.

Then, a positive photoresist 16 of 3 μm thickness is coated on the third-layer metal film 15. Then, as shown in FIG. 2Q, the photoresist 16 is exposed in the regions containing the display portion A and the peripheral circuit portion B by the normal exposure amount. A first reticle (exposure mask) 17 having a light-shielding pattern 17a of the wiring shape and a light-shielding pattern 17b of the pixel shape is used at the first-time exposure.

According to such first-time exposure, a light-irradiated region 16a is formed in the photoresist 16 by the light being transmitted through the first reticle 17. This first-time exposure is the full exposure.

Then, the process goes to the second-time exposure step of the photoresist 16 without the development of the photoresist 16.

As shown in FIG. 2R, a second reticle (exposure mask) 18 having a transmission portion, which transmits the exposure light to at least the pixel region of the display portion A, and a light-shielding portion, which shields the overall area of the peripheral circuit portion B from the light, is used at the second-time exposure. Also, a quantity of exposure light at the second-time exposure is set to ⅓ to ⅔ of a quantity of exposure light at the first-time exposure. Accordingly, the pixel region of the photoresist 16, onto which the light is not irradiated at the first-time exposure, is half-exposed. It is to be desired that the half-exposure should be applied in such a way that a remaining thickness of the photoresist 16 in the display portion A, which is subjected to the second-time exposure by using the photoresist 16 whose initial thickness is set to 3.0 μm, becomes 1.5 μm.

The multiple exposure of the photoresist 16 is carried out by using a stepper exposing machine, for example.

As a result, the photoresist 16 in the pixel region becomes the half-exposed portion, and the light is not irradiated other wiring pattern portions. In addition, the exposure light has already been irradiated onto the photoresist 16 in the portion, in which the third-layer metal film 15 and the ITO film 14 are not left, by the normal quantity.

Then, the photoresist 16 is developed. Thus, as shown in FIG. 2S, the photoresist 16 left in the peripheral circuit portion B has the same thickness as that obtained when the first-time exposure is applied, while the photoresist 16 left in the pixel region of the display portion A is reduced to a thickness t$_2$, which is thinner than the thickness in the initial state, e.g., about ⅓ to ⅔ of the photoresist 16 in the peripheral circuit portion B, due to the half exposure.

Then, the third-layer metal film 15 is etched by the RIE method using the chlorine gas while using the stepped pattern of the photoresist 16 as a mask, and then the transparent conductive film 14 is wet-etched by the oxalic acid. As a result, as shown in FIG. 2T, third-layer wiring patterns 19a, 19b made of the metal film 15 and the ITO film 14 are formed in the peripheral circuit portion B whereas a pixel electrode 19c made of the ITO film 14 is formed in the display portion A.

Then, as shown in FIG. 2U, the oxygen ashing is applied to the photoresist 16. The conditions of this oxygen ashing are set such that the photoresist 16 on the pixel electrode 19c is eliminated and the photoresist 16 is still left in the peripheral circuit portion B.

As the method of adjusting the thickness of such photoresist 16, the etching end point is decided previously by detecting the carbon (C) in the plasma produced during the ashing and then monitoring the signal intensity. Here the care must be taken not to cause the excessive over-ashing. In this case, assume that the thickness of the photoresist 16 remaining on the pixel electrode 19c after the third-layer metal film 15 is etched is set to t, the thickness of the photoresist 16 in the peripheral circuit portion B is reduced by about t+α. In this case, α is a thickness reduced by the over-ashing.

In this state, the third-layer wiring patterns 19a, 19b in the peripheral circuit portion B are covered with the photoresist 16 and the third-layer metal film 15 left in the display portion A is exposed.

Then, as shown in FIG. 2V, the third-layer metal film 15 on the pixel electrode 19c being not covered with the photoresist 16 is removed by the etching. In this case, in order to leave the ITO film 14 constituting the pixel electrode 19c, the dry or wet etching is carried out by using the etchant that has the high selective etching ratio to ITO. In the peripheral circuit portion B, the metal film 15 constituting the third-layer wiring patterns 19a, 19b is covered with the photoresist 16 and therefore such metal film 15 is not etched.

Then, as shown in FIG. 2W, the photoresist 16 is removed. In this case, there is a possibility that the planarizing resin film 13 is thinned. Therefore, in order to leave the planarizing resin film 13 when the photoresist 16 is ashed, or in order not to damage the color filters 12f, the thickness of the planarizing resin film 13 must be adjusted. However, an inorganic film made of silicon nitride, silicon oxide, or the like may be formed between the planarizing resin film 13 and the ITO film 14. In this case, the planarizing resin film 13 is never thinned by the ashing.

Then, the insulating substrate 1, the overlying pixel electrode 19c, the third-layer wiring patterns 19a, 19b, etc. are cleaned. Then, as shown in FIG. 2W, an alignment film 20 made of resin is printed on the display portion A and the peripheral circuit portion B. More particularly, the alignment film 20 is formed on the wiring patterns 19a, 19b, the pixel electrode 19c, and the planarizing resin film 13.

With the above, the steps of forming the TFT substrate constituting the liquid crystal display device are ended.

As described above, according to the present embodiment, since the color filters 12f are formed on the insulating substrate 1 on which the TFTs 6, 7, 8 are formed, the displacement between the pixel electrode 19c and the color filters 12f can be prevented. As a result, the lamination of the insulating substrate 1 on the TFT side and the opposing substrate (not shown) can be made easy.

In addition, in the peripheral circuit portion B, the parasitic capacitance between the second-layer wiring patterns 10a to 10e and the third-layer wiring patterns 19a, 19b can be reduced by the intervention of the color resin film 12 having the low dielectric constant.

Further, since the color resin film 12 constituting the color filters 12f formed in the display portion A is left in the peripheral circuit portion B, the planarizing resin film 13 is lifted up. Therefore, the level difference between the peripheral circuit portion B and the display portion A can be reduced or can be absorbed. This effect is particularly effective when the structure in which the inorganic insulating film (not shown) is formed between the planarizing resin film 13 and the color filters 12f is employed.

In this case, the color filters 12f may be formed on the pixel electrode 19c.

(Second Embodiment)

In the first embodiment, connection plugs between the third-layer wiring patterns 19a, 19b and the TFTs 6, 7 are made of the ITO film in the peripheral circuit portion B of the TFT substrate. But such connection plugs may be made of the metal film.

Also, in the first embodiment, the color resin film 12 serving as the base of the color filters 12f is left in the peripheral circuit portion B. However, if the planarization of the upper surface of the planarizing resin film 13 can be attained over the entire surface of the substrate unless the color resin film 12 is left in the peripheral circuit portion B, the color resin film 12 may be removed from the peripheral circuit portion B.

Next, steps of forming the TFT substrate employing such structure will be explained with reference to FIGS. 3A to 3E hereunder.

Then, steps required until a structure shown in FIG. 10A is formed will be explained hereunder.

First, in the situation shown in FIG. 2L in the first embodiment, the photosensitive color resin film 12 is formed on the silicon nitride film 11. Then, the photosensitive color resin film 12 is exposed/developed, so that the color filters 12f are formed in the display portion A and also the color resin film 12 is removed from the peripheral circuit portion B. The color filters 12f are formed in red, green, and blue individually. The forming method is similar to the method of forming the color filters 12f in the first embodiment.

Figure 3A:
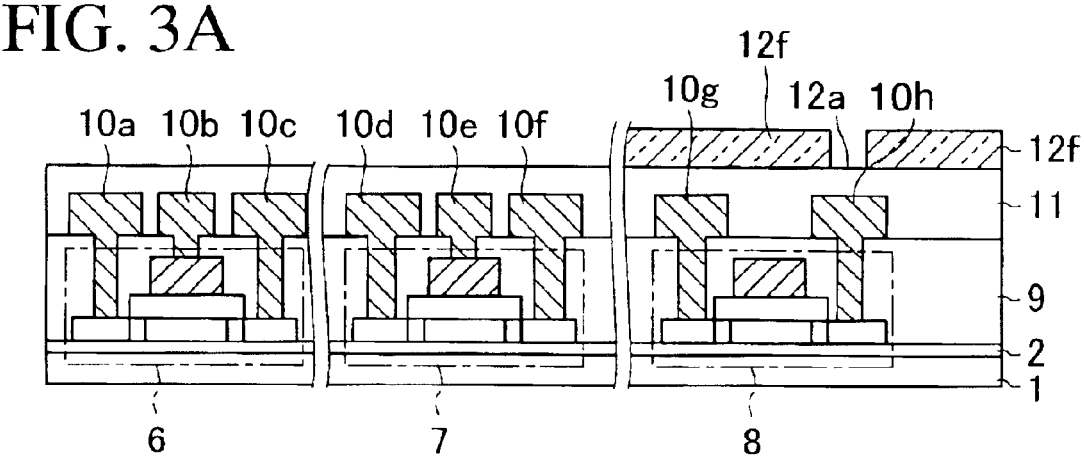
FIGS. 3A to 3E are sectional views showing steps of manufacturing a TFT substrate of a liquid crystal display device according to a second embodiment of the present invention.
Figure 3B:
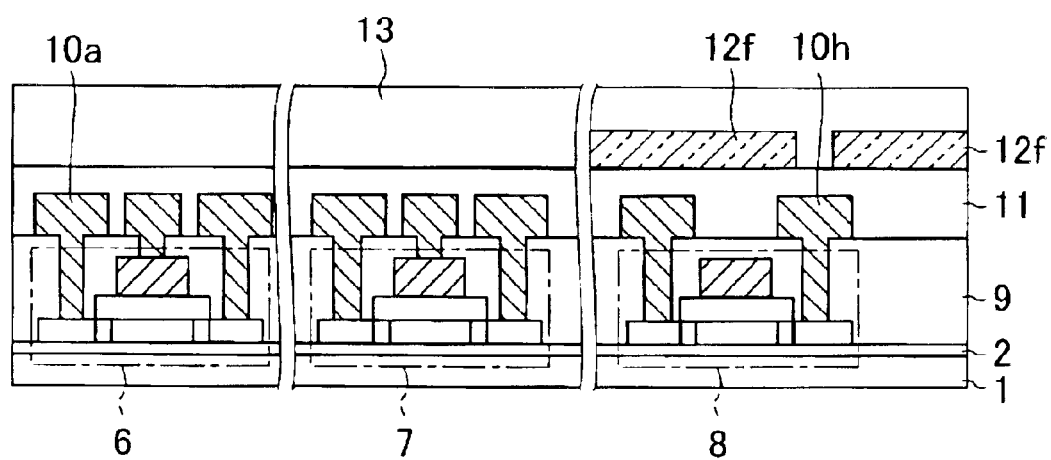
Figure 3C:
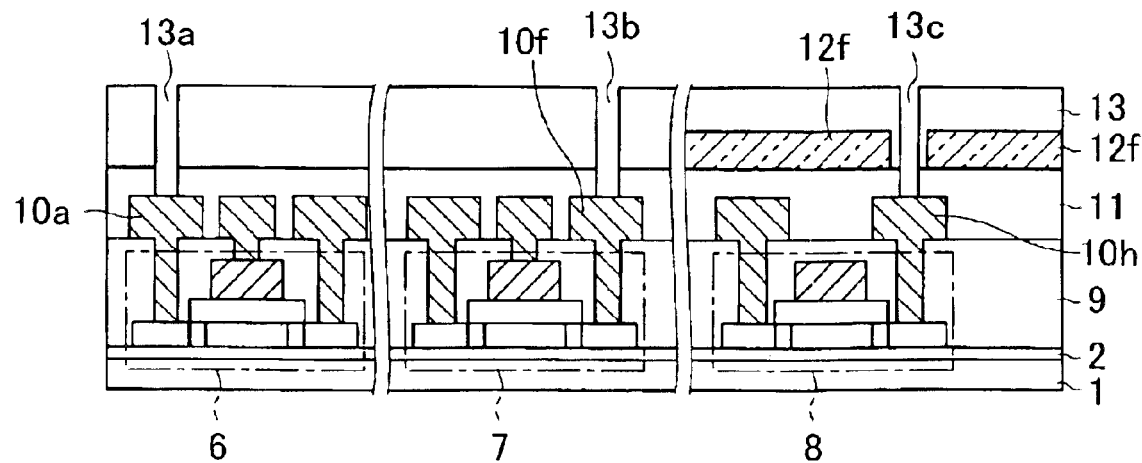

Then, as shown in FIG. 3B, the planarizing resin film 13 is formed on the color filters 12f and the silicon nitride film 11. Then, as shown in FIG. 3C, the holes 13a to 13c are formed in the planarizing resin film 13 and the silicon nitride film 11. In this case, the same method as the first embodiment is employed to form the planarizing resin film 13 and the holes 13a to 13c.

Then, a titanium film of 100 to 300 nm thickness, for example, is formed as a third-layer metal layer (third metal layer) in the holes 13a to 13c and on the planarizing resin film 13 by the sputter method. In this case, as the third-layer metal layer, an aluminum film, an aluminum alloy film, or other metal material film may be employed.

Figure 3D:
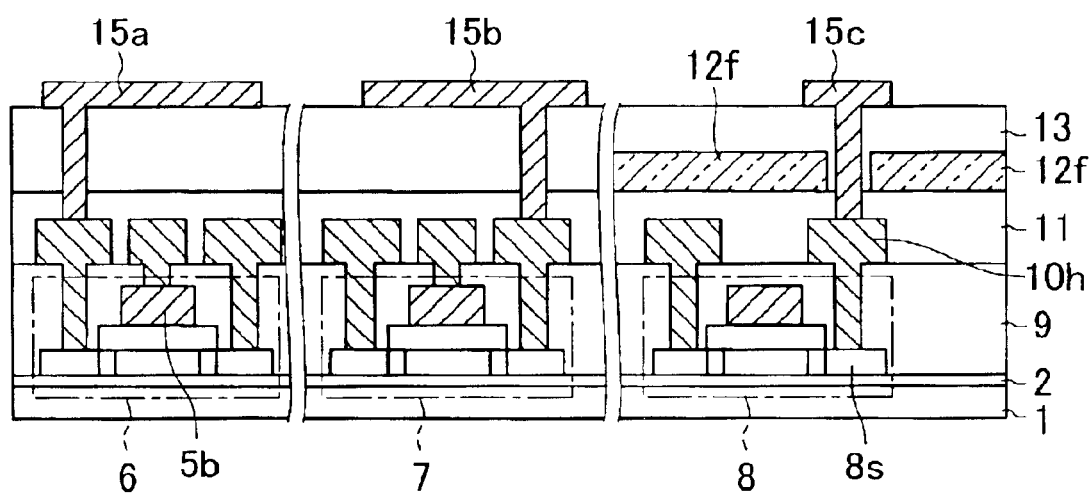

Then, as shown in FIG. 3D, the third-layer wiring pattern 15a to 15c are formed by patterning the third-layer metal film by virtue of the photolithography method using the resist pattern (not shown) and the RIE method.

Thus, in the peripheral circuit portion B, plural TFTs 6,7 are connected electrically by the second-layer wiring patterns 10a to 10h and the third-layer wiring patterns 15a, 15b. Also, in the display portion A, the source region 8s of the TFT 8 is extended onto the planarizing resin film 13 via the second-layer wiring pattern 10h and the third-layer wiring pattern 15c.

Figure 3E:
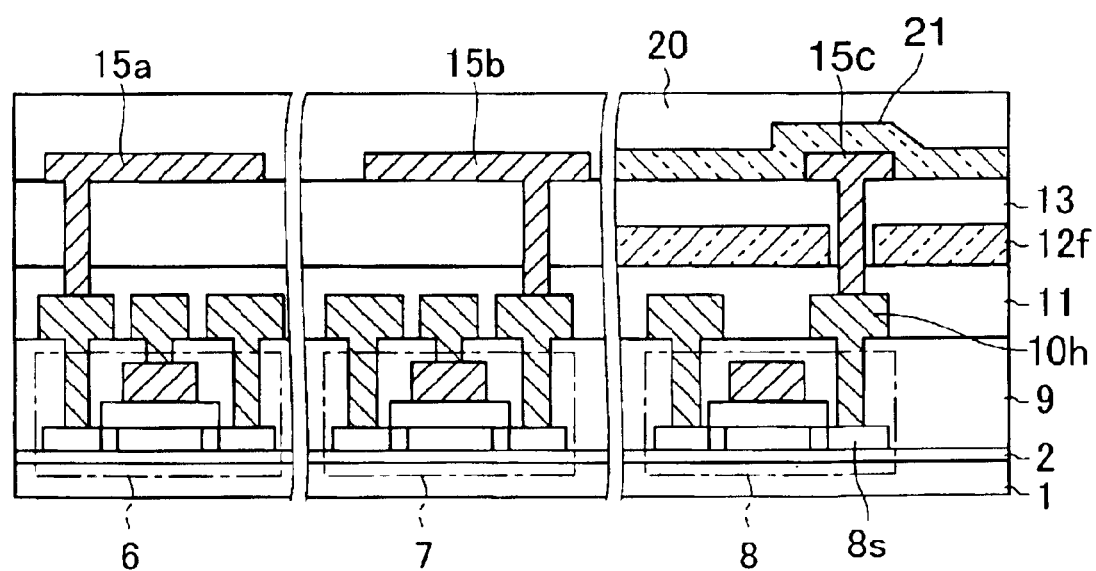

Then, a transparent conductive film made of indium oxide material, ITO, or the like having a thickness of 50 to 100 nm, preferably 70 nm is formed on the planarizing resin film 13 and the third-layer wiring patterns 15a, 15b, 15c by the sputter method. Then, as shown in FIG. 3E, a pixel electrode 21 being connected to the third-layer wiring pattern 15c, which is extended from the source region 8s of the TFT 8 in the display portion A, is formed by patterning the transparent conductive film by the normal photolithography method using the wet etching.

In addition, the films on the insulating substrate 1 are annealed at the temperature of 200 to 300° C. in the hydrogen-mixed gas atmosphere or the nitrogen atmosphere. Such annealing process is effective for the characteristic improvement of the TFTs 6, 7, 8 and the characteristic stabilization of the planarizing resin film 13.

Then, like the first embodiment, the alignment film 20 for covering the pixel electrode 21 and the third-layer wiring patterns 15a, 15b is formed on the planarizing resin film 13.

In this case, in the peripheral circuit portion B, except the case where the third-layer wiring patterns 15a, 15b are made of aluminum or aluminum alloy, the transparent conductive film may be left to have a shape along the third-layer wiring patterns 15a, 15b to thereby the cover upper surfaces and the side surfaces of the third-layer wiring patterns 15a, 15b.

As described above, according to the present embodiment, since the color filters 12f are formed on the TFT substrate side, the displacement between the pixel electrode 19c and the color filters 12f can be prevented. Therefore, the lamination of the insulating substrate 1 on the TFT side and the opposing substrate (not shown) can be facilitated. Also, in the peripheral circuit portion B, the planarizing resin film 13 formed between the second-layer wiring patterns 10a to 10f and the third-layer wiring patterns 15a, 15b has the thickness that can reduce the parasitic capacitance. Therefore, the high-speed operation of the peripheral circuits is hardly lowered.

(Third Embodiment)

In the first embodiment, one layer of any one of the red, green, and blue color resin films, preferably the red color resin films 12f is left in the peripheral circuit portion B. But two layers or three layers of the color resin films may be left. However, in the case the thickness the color resin films becomes excessively thick in view of the thickness of the planarizing resin film 13 if three layers of the color resin films are left in the peripheral circuit portion B, it is a limit to leave two layers of the color resin films in the peripheral circuit portion B.

Figure 4:
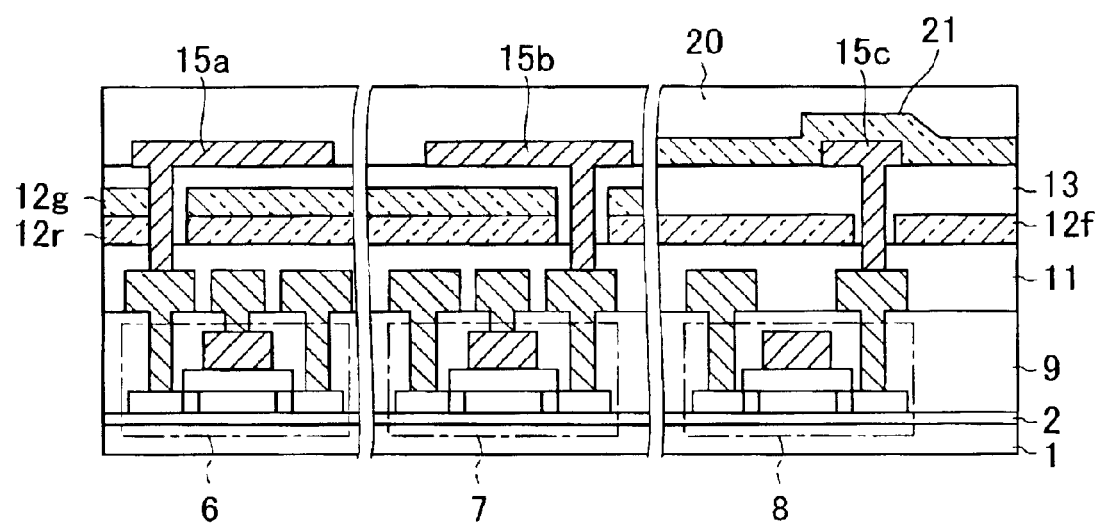
FIG. 4 is a sectional view showing a TFT substrate of a liquid crystal display device according to a third embodiment of the present invention.

In this fashion, if the color resin films are left in the peripheral circuit portion B as a plural-layered structure, for example, as a double-layered structure consisting of the lower red color resin film 12r and the upper green color resin film 12g with respect to the insulating substrate 1, as shown in FIG. 4, the color resin film having the multi-layered structure functions as the black light-shielding film.

Accordingly, in the liquid crystal display device having the structure in which the light is irradiated from the upper side of the insulating substrate 1, the light irradiation onto the TFTs 6, 7 can be shielded by the color resin films 12r, 12g. Therefore, the disadvantages due to the light irradiation such as the increase of the leakage current by the photoelectric effect of the TFTs 6, 7 can be overcome. Also, in the liquid crystal display device having the structure in which the light is irradiated from the lower side of the insulating substrate 1, the transmission of the light can be blocked by the color resin films 12r, 12g.

(Fourth Embodiment)

In the present embodiment, the event the third-layer wiring pattern can be formed by steps that are shorter than the above embodiments if the third-layer metal layer is formed by the mask selective sputter method will be explained hereunder. There are various mask selective sputter methods according to the forming sequence of the transparent conductive film and the third-layer metal layer.

Figure 5A:
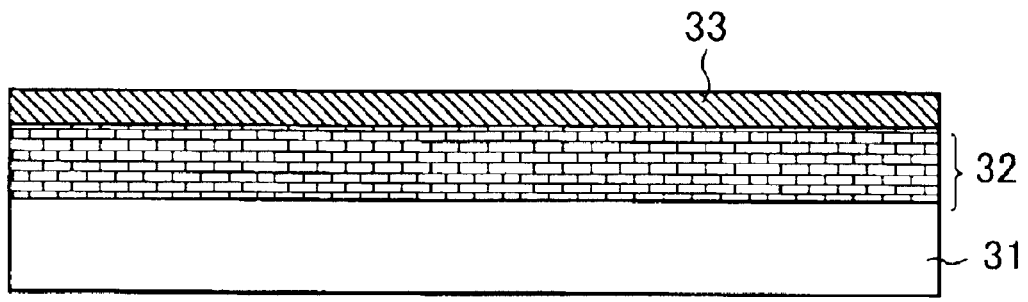
FIGS. 5A and 5B are process views showing a first mask selective sputter method employed in a fourth embodiment of the present invention.
Figure 5B:
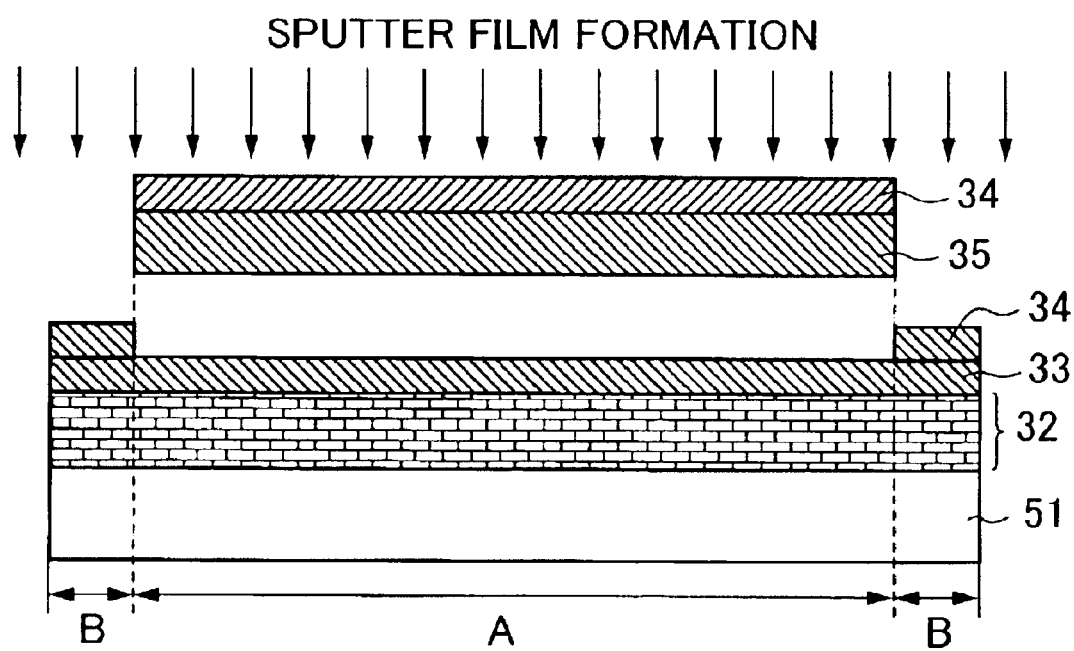

FIGS. 5A and 5B show a first mask selective sputter method of forming the third-layer metal layer after the transparent conductive film is formed.

First, as shown in FIG. 5A, a device structure portion 32 containing the TFTs, first-layer and second-layer metal layers, an interlayer insulating film, a planarizing resin film, etc. is formed on an insulating substrate 31. The uppermost of the device structure portion 32 is formed of the planarizing resin film. Then, an ITO film 33 as the transparent conductive film is formed on the device structure portion 32 by the normal sputter method.

Then, as shown in FIG. 5B, in the situation that the display portion A of the device structure portion 32 is shielded from the sputter source by a sputter metal mask 35, a Ti film of 50 nm thickness and an aluminum film of 200 nm thickness are formed on the ITO film 33 as a third-layer metal layer 34 by the sputter. Accordingly, the films 33, 34 having the ITO/Ti/Al multi-layered structure are formed in the peripheral circuit portion B of the device structure portion 32, while only the single-layer ITO film 33 is formed in the display portion A.

Figure 6A:
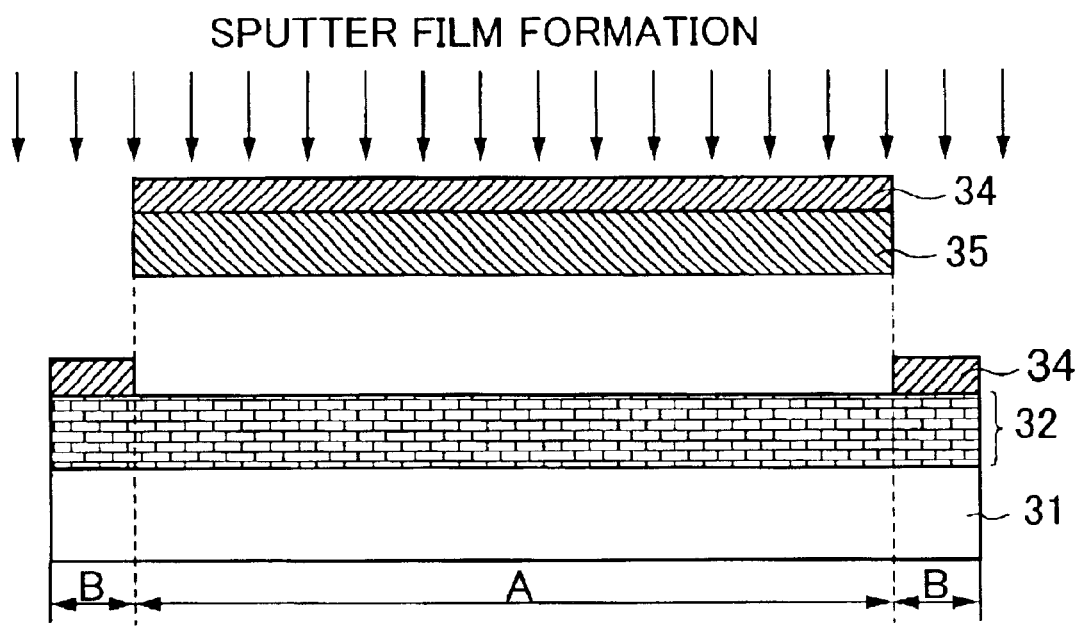
FIGS. 6A and 6B are process views showing a second mask selective sputter method employed in the fourth embodiment of the present invention.
Figure 6B:
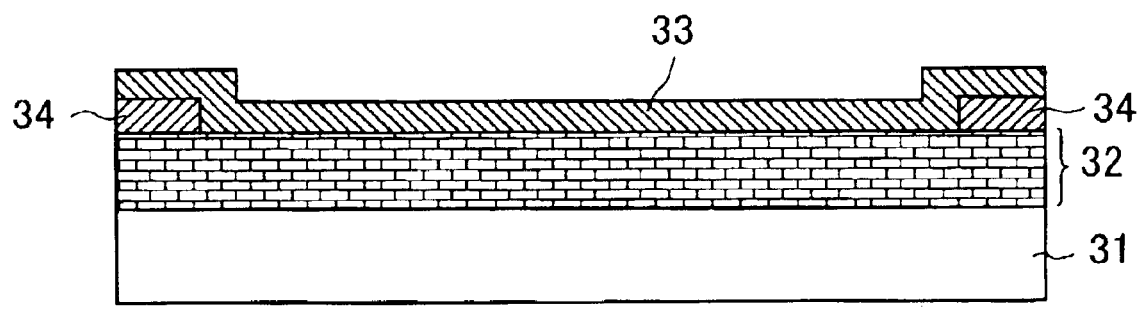

FIGS. 6A and 6B show a second mask selective sputter method of forming the transparent conductive film after the third-layer metal layer is formed.

First, as shown in FIG. 6A, the device structure portion 32 is formed on the insulating substrate 31. Then, in the situation that the display portion A of the device structure portion 32 is shielded from the sputter source by using the sputter metal mask 35, a Ti film of 50 nm thickness and an aluminum film of 200 nm thickness are formed sequentially on the planarizing resin film of the device structure portion 32 as the third-layer metal layer 34 via the sputter metal mask 35 by the sputter.

Then, as shown in FIG. 6B, the sputter metal mask 35 is removed from the upper position of the insulating substrate 31, and then the ITO film is formed as the transparent conductive film 33 on the device structure portion 32 and the third-layer metal layer 34 by the ordinary sputter method. Accordingly, the films 33, 34 having the Ti/Al/ITO multi-layered structure are formed in the peripheral circuit portion B, while only the single-layer transparent conductive film 33 is formed in the display portion A.

Next, steps of forming the pixel electrode and the third-layer wiring pattern by using the first mask selective sputter method shown in FIGS. 5A and 5B will be explained hereunder.

First, according to the same steps as those shown in FIG. 2A to FIG. 2K, the TFTs 6, 7, 8, the first interlayer insulating film 9, the second-layer wiring patterns 10a to 10h are formed on the insulating substrate 1. Since their details are similar to those in the first embodiment, they will be omitted herein. However, as the film for the second-layer wiring patterns 10a to 10h, the double-layered structure in which the Ti film of 50 nm thickness and the Al film of 200 nm thickness are formed sequentially or the single-layer structure or the multi-layered structure consisting of Mo, Ti, Al alloys, etc. is formed.

Figure 7A:
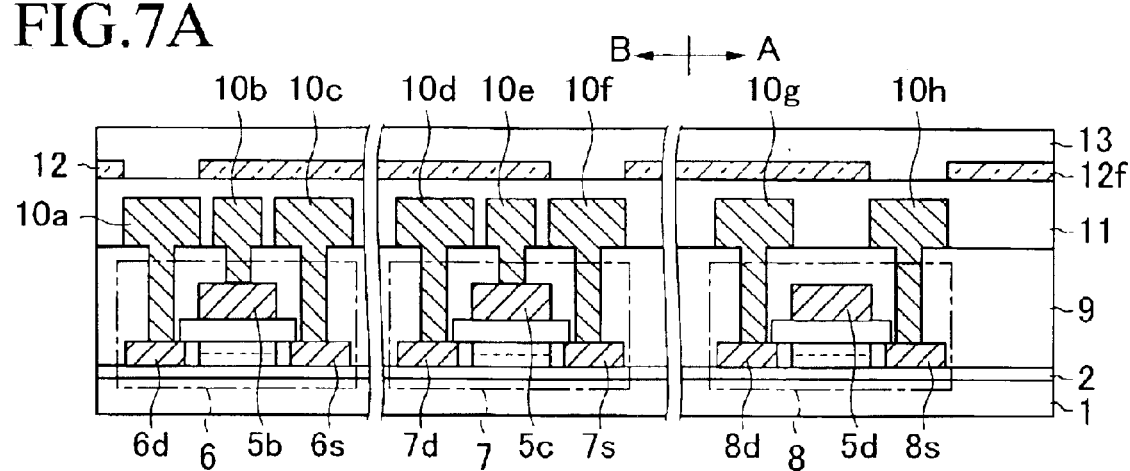
FIGS. 7A to 7H are sectional views showing steps of manufacturing a TFT substrate of a liquid crystal display device according to the fourth embodiment of the present invention.

Then, as shown in FIG. 7A, the silicon nitride film 11 for covering the second-layer wiring patterns 10a to 10h is formed on the first interlayer insulating film 9 by the PECVD method to have a thickness of 50 to 200 nm, preferably 100 nm. Then, the photosensitive red, green, and blue color resin films 12 are coated sequentially on the silicon nitride film 11 and then are exposed and developed, whereby the trichromatic color filters 12f are formed in the display portion A and also one layer or two layers of the color resin films 12 are left in the peripheral circuit portion B. The color resin films 12 and the color filters 12f are patterned by the same method as the above embodiments. In this case, the color resin films 12 are removed from the hole forming regions and their peripheries.

Then, the photosensitive planarizing resin film 13 made of polyimide, acryl, or the like is formed on the color resin films 12 and the silicon nitride film 11. It is preferable that this planarizing resin film 13 should have a thickness of more than 3 to 4 μm to achieve the planarization of the surface. In this case, an inorganic film made of SiO2, SiNx, or the like having a thickness of more than 1 μm may be formed in place of the planarizing resin film 13.

Figure 7B:
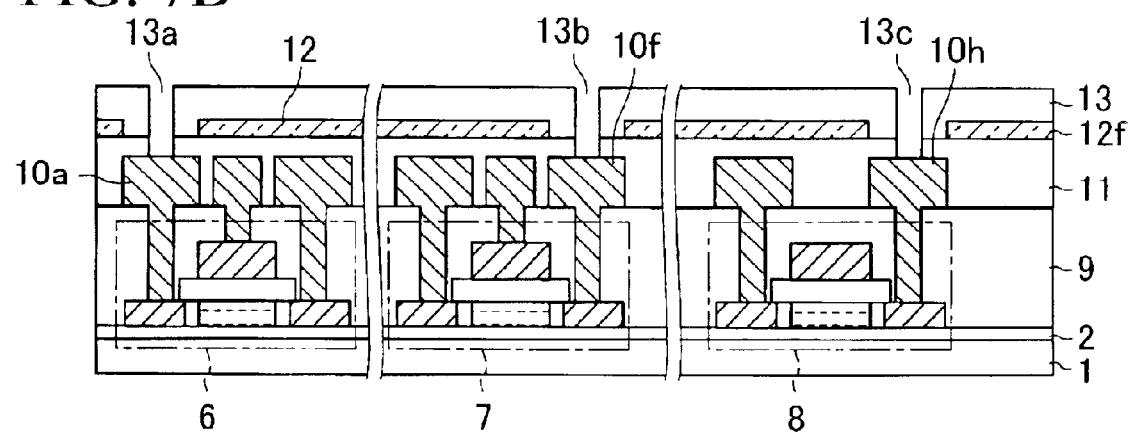

Then, as shown in FIG. 7B, the holes 13a to 13c are formed on the second-layer wiring patterns 10a to 10h by exposing/developing the planarizing resin film 13. In the area in which the pixels are formed, the hole 13c is formed on the second-layer wiring connected to the source region 8s of the TFT 8. In addition, the silicon nitride film 11 is etched via the holes 13a to 13c in the planarizing resin film 13. In this case, in order to adjust the etching rate of the silicon nitride film 11 to the planarizing resin film 13, the ratios of $CF_4$, $SF_6$, and $O_2$ employed as the etching gas are controlled.

Figure 7C:
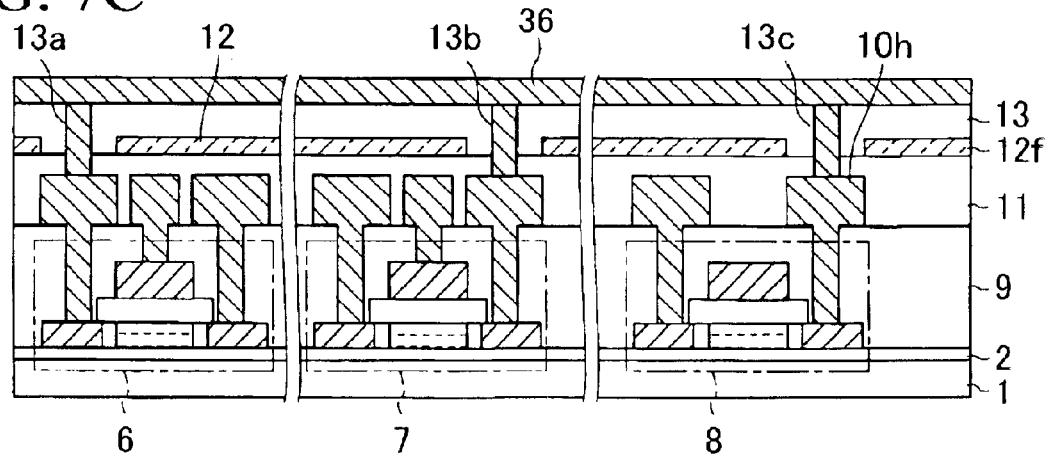

Then, as shown in FIG. 7C, an ITO film of 70 nm thickness is formed on the planarizing resin film 13 and the holes 13a to 13c as a transparent conductive film 36 by the sputter method.

Figure 7D:
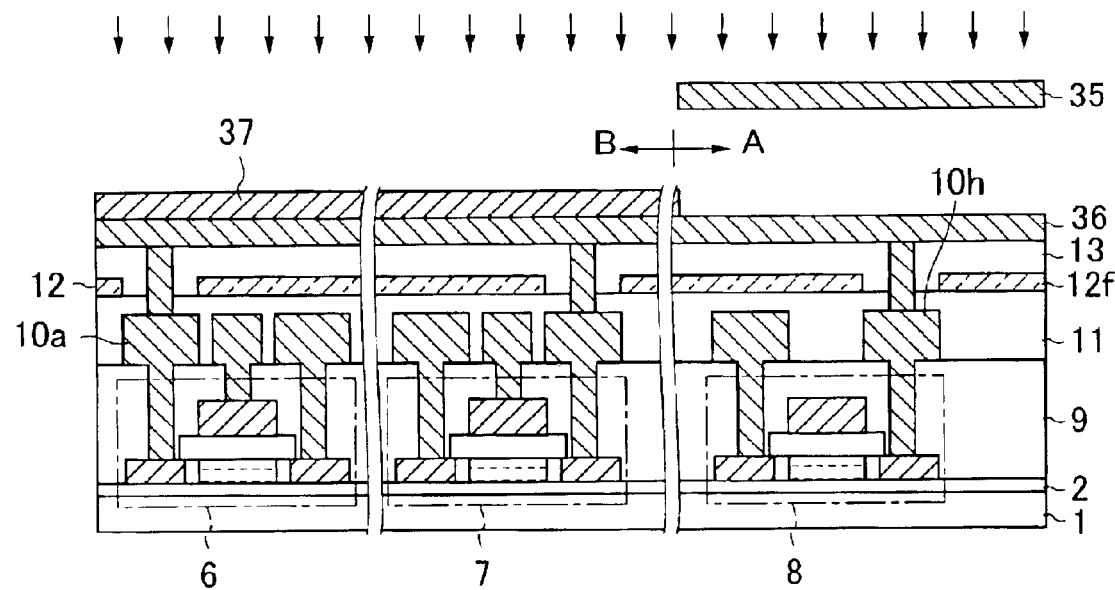

Then, as shown in FIG. 7D, while shielding the transparent conductive film 36 in the display portion A by the sputter metal mask 35, the titanium (Ti) film of 50 nm thickness and the aluminum (Al) film of 200 nm thickness are formed continuously on the transparent conductive film 36 in the peripheral circuit portion B by the sputter method. The Ti film and the Al film act as a third-layer metal layer 37. The Ti film functions as the intermediate metal blocking film, like the fourth embodiment. In this case, molybdenum may be formed as the intermediate metal blocking film.

Figure 8:
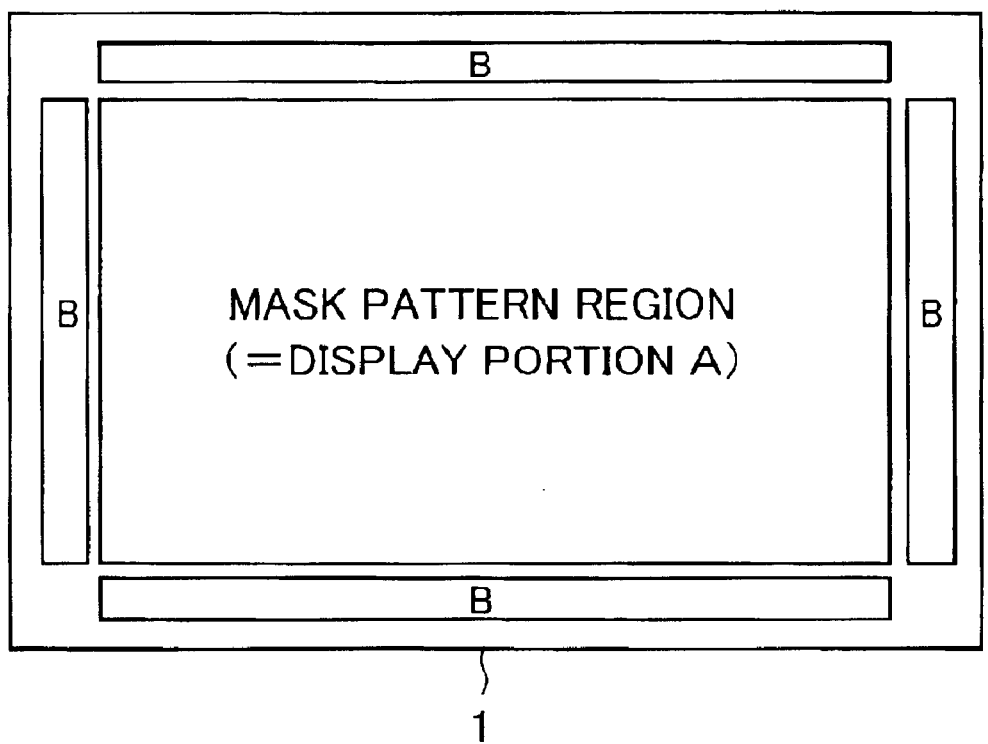
FIG. 8 is a plan view showing a third-layer metal layer forming region employed in the fourth embodiment of the present invention.

The arrangement of the display portion A, in which only the transparent conductive film 36 is formed on the insulating substrate 1, and the peripheral circuit portion B, in which the third-layer metal layer 37 and the transparent conductive film 36 are formed, is shown in a plan view of FIG. 8. In this case, all regions except the display portion A may be employed as the region in which the third-layer metal layer 37 is formed.

Figure 7E:
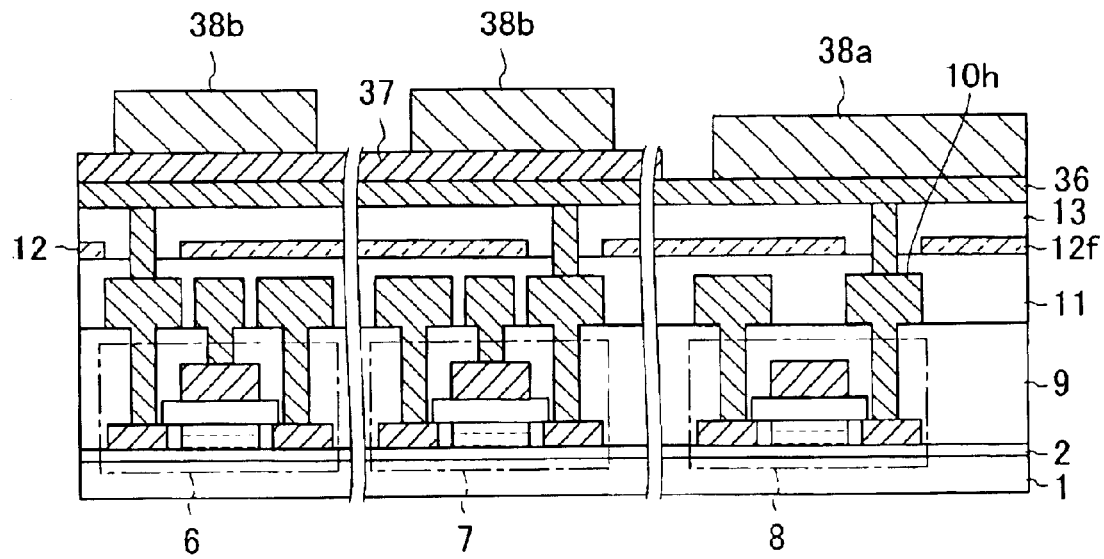

Then, the sputter metal mask 35 is removed from the upper position of the insulating substrate 1, and then a positive photoresist 38 is coated on the third-layer metal layer 37 and the transparent conductive film 36 until a thickness of 1.5 μm. Then, as shown in FIG. 7E, the photoresist 38 is exposed/developed to form a pixel resist pattern 38a in the display portion A and wiring resist patterns 38b in the peripheral circuit portion B.

Figure 7F:
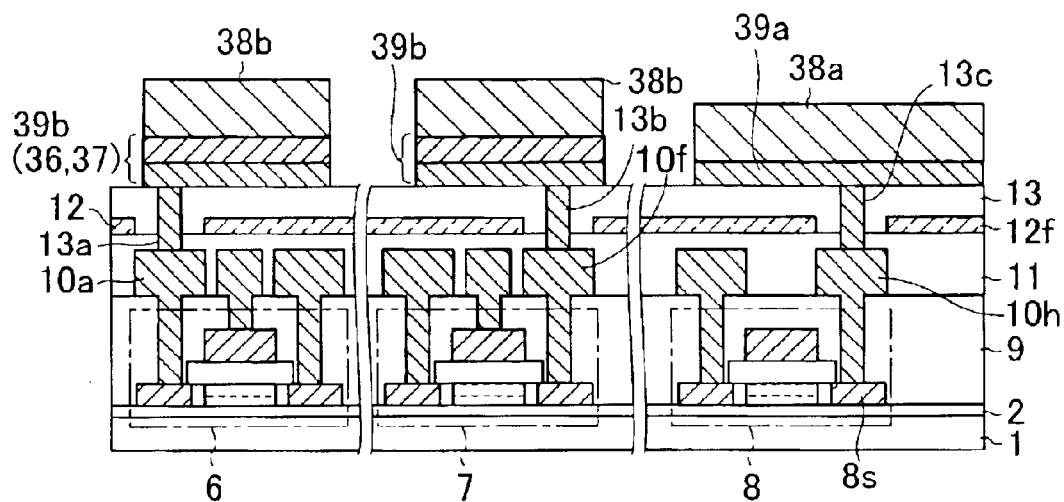

Then, while using the pixel resist pattern 38a and the wiring resist patterns 38b as a mask, the transparent conductive film 36 is etched in the display portion A and also the third-layer metal layer 37 and the ITO film 36 are etched sequentially. Thus, as shown in FIG. 7F, a pixel electrode 39a is formed in the display portion A and also third-layer wiring patterns 39b are formed in the peripheral circuit portion B. The pixel electrode 39a is connected to the two-layer wiring pattern 10i via the hole 13c and thus connected electrically to the source region 8s of the TFT 8. Also, the third-layer wiring patterns 39b in the peripheral circuit portion B are connected to the two-layer wiring patterns 10a, 10f via the transparent conductive film 36 that is filled in the holes 13a, 13b.

Figure 7G:
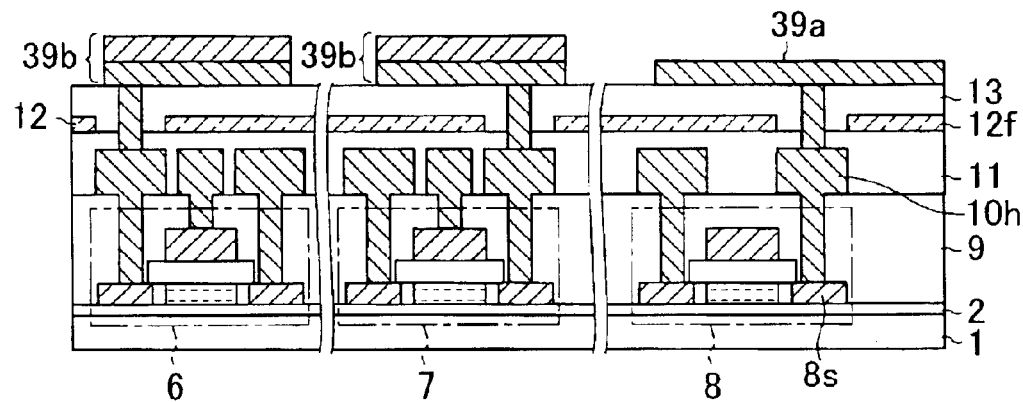
Figure 7H:
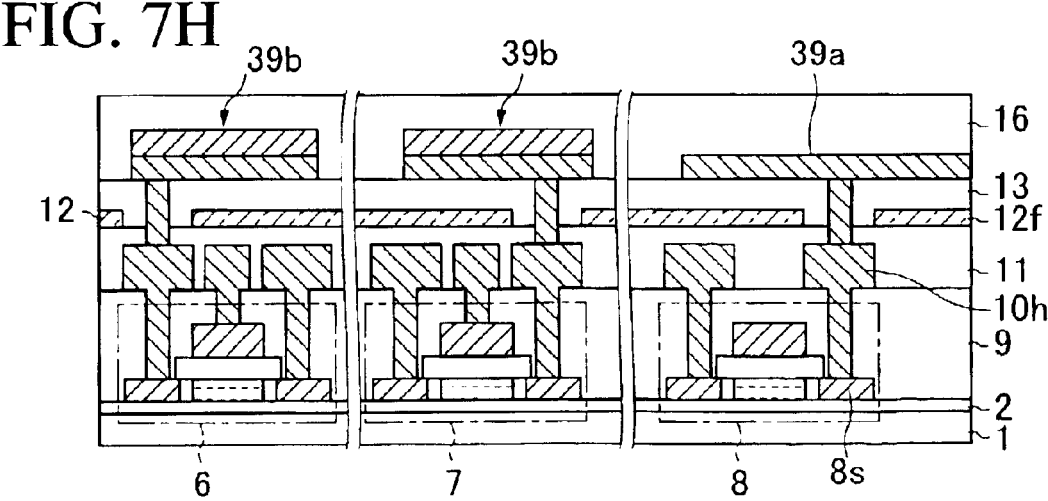

Then, as shown in FIG. 7G, the pixel resist pattern 38a and the wiring resist patterns 38b are removed by the oxygen ashing. Then, as shown in FIG. 7H, an alignment film 20 for covering the pixel electrode 39a and the third-layer wiring patterns 39b is formed on the planarizing resin film 13.

As described above, according to the present embodiment, the third-layer metal layer 37 is formed only in the peripheral circuit portion B by the mask selective sputter method and also the transparent conductive film 36 is formed in the display portion A and the peripheral circuit portion B. Therefore, the pixel electrode 39a and the third-layer wiring patterns 39b can be formed by patterning the transparent conductive film 36 and the third-layer metal layer 37 by means of one photolithography step. As a result, the manufacturing steps can be simplified and the production cost can be reduced.

In this case, in FIG. 7A to FIG. 8, the same symbols as those in the above embodiments denote the same elements.

(Fifth Embodiment)

In the present embodiment, the peripheral circuit portion having a high-frequency signal transmission circuit that is constructed by the first to third-layer metal layers shown in the above embodiments will be explained hereunder, and also a structure in which the third-layer metal layer is employed for the electromagnetic wave shielding of the high frequency circuit will be explained hereunder.

Figure 9:
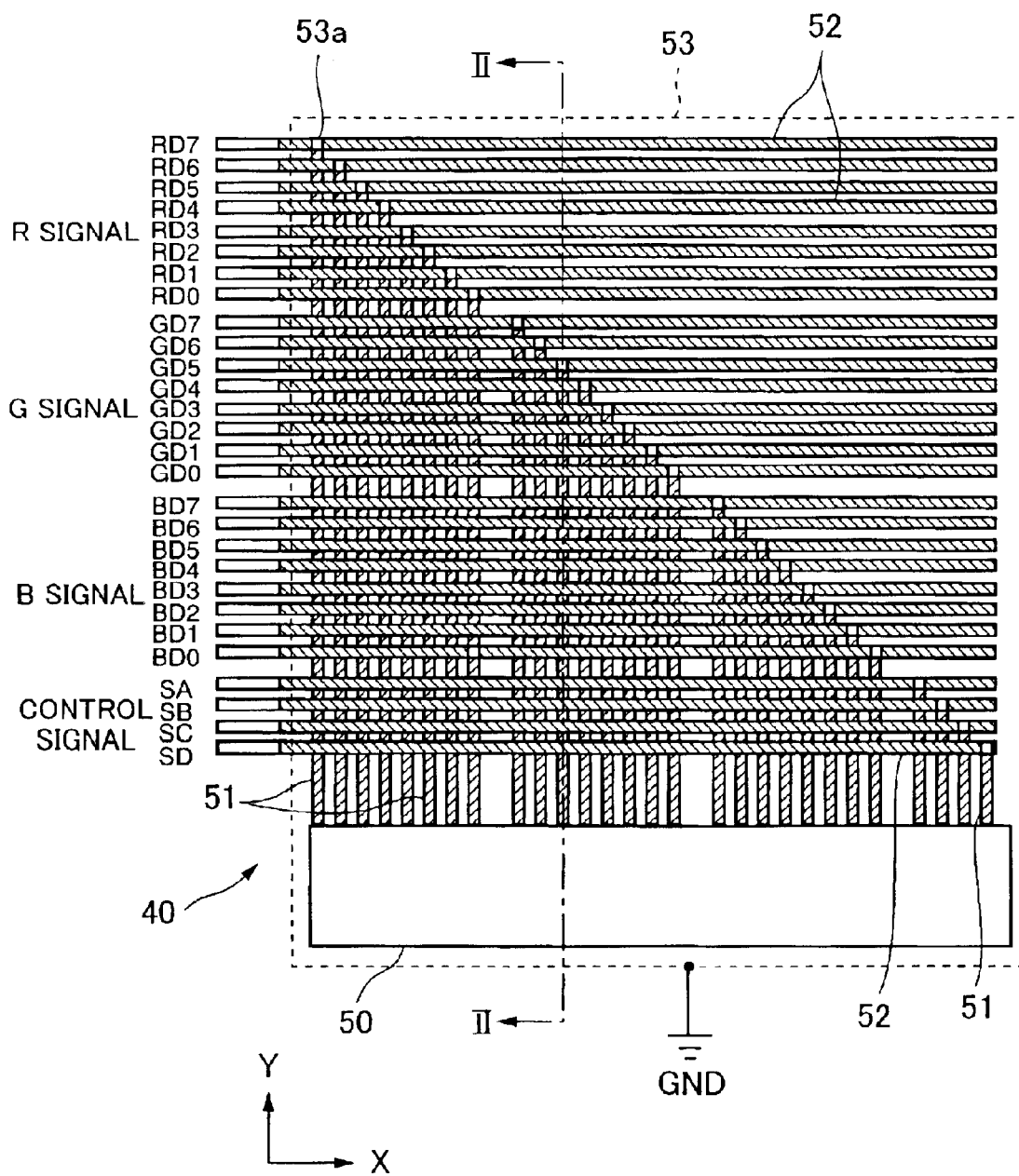
FIG. 9 is a plan view showing a high-frequency signal transmission circuit of a display device according to a fifth embodiment of the present invention.
Figure 10:
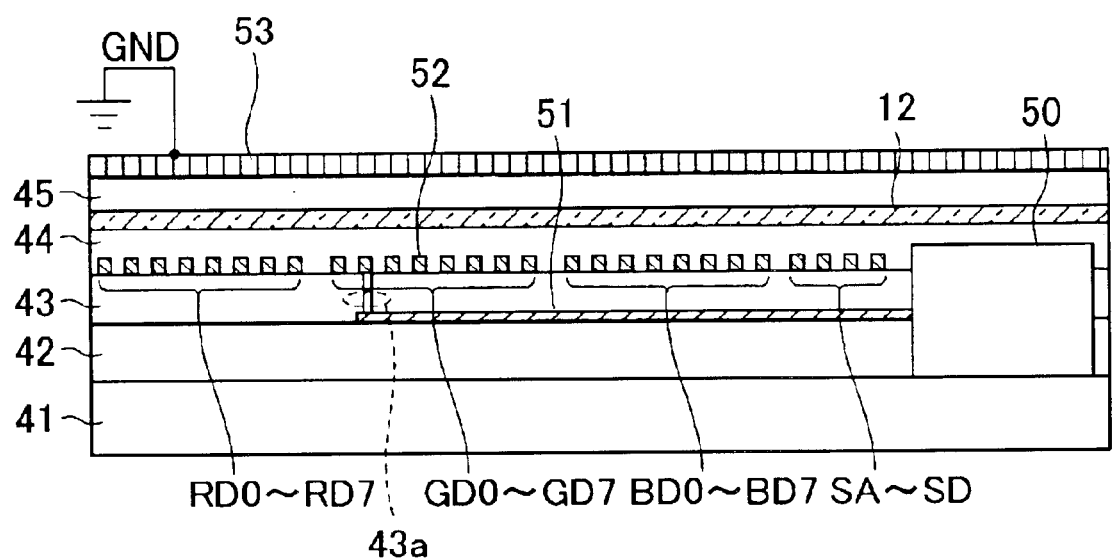
FIG. 10 is a sectional view showing the high-frequency signal transmission circuit of the display device according to the fifth embodiment of the present invention.

FIG. 9 is a plan view showing a high-frequency signal transmission circuit that is constructed by patterning the first to third-layer metal layers shown in the above embodiments, and FIG. 10 is a sectional view showing the electromagnetic wave shielding structure.

In the TFT substrate, trichromatic digital display signals (8 bit×3) of red (R), green (G), and blue (B), which are input into high-frequency input terminals RD0–RD7, GD0–GD7, and BD0–BD7 of a high-frequency signal transmission circuit 40, are input into the peripheral circuits via wirings in the high-frequency signal transmission circuit 40. Also, in the TFT substrate, high-frequency control signals, which are input into control signal terminals SA, SB, SC, SD of the high-frequency signal transmission circuit 40, are input into the peripheral circuits via the wirings in the high-frequency signal transmission circuit 40.

Although different according to the display format, in the case of the XGA (horizontal 1024× vertical 768), the master clock frequency is about 65 MHz at the single port and about 33 MHz at the dual port. Since the electromagnetic wave radiation occurs during the transmission of such high-frequency signal to exert a bad influence upon the environment and the human body, the measure for preventing the electromagnetic wave radiation is required.

The high-frequency signals input into the TFT substrate from the outside are transmitted to a high-frequency circuit portion 50, etc. via the high-frequency signal transmission circuit 40 shown in the plan view in FIG. 9. FIG. 10 is a section taken along a II—II line in FIG. 9. In this case, FIG. 9 shows the arrangement of the wirings, etc.

In the peripheral circuit portion B, the high-frequency signal transmission circuit 40 has first-layer wirings 51 formed on an insulating film 42 on an insulating substrate 41, second-layer wirings 52 formed on a first interlayer insulating film 43 that covers the first-layer wirings 51 and the insulating film 42, and a fixed-potential metal pattern 53 formed on a planarizing resin film 45 over the second-layer wirings 52 and the first interlayer insulating film 43. A silicon nitride film as a second interlayer insulating film 44 is formed between the planarizing resin film 45 and the second-layer wirings 52. Also, the color resin film 12 that is patterned in the display portion A to act as the color filter is formed between the second interlayer insulating film 44 and the planarizing resin film 45.

The first-layer wirings 51 are formed by patterning the first-layer metal layer constituting the gate electrodes 5b to 5d in the first embodiment, for example. Also, the second-layer wirings 52 are formed by patterning the second-layer metal layer constituting the second-layer wiring patterns 10a to 10h in the first embodiment, for example. In addition, the fixed-potential metal pattern 53 is formed by patterning the third-layer metal layer constituting the third-layer wiring patterns 15a to 15c in the first embodiment, for example.

The first-layer wirings 51 are formed in plural at an interval in parallel in the vertical direction (Y direction) in FIG. 9. Also, the second-layer wirings 52 are formed in plural at an interval in parallel in the lateral direction (X direction) in FIG. 9.

One first-layer wiring 51 is connected to one second-layer wiring 52 via a contact hole 43a formed in the first interlayer insulating film 43.

The second-layer wirings 52 are connected to the high-frequency input terminals RD0–RD7, GD0–GD7, BD0–BD7 and the control signal terminals SA, SB, SC, SD. The first-layer wirings 51 are connected to the high-frequency circuit portion 50 formed on the insulating substrate 41. The high-frequency circuit portion 50 is constructed by the TFTs, the first-layer wiring patterns, the second-layer wiring patterns, etc. in the peripheral circuit portion B shown in the first embodiment.

The fixed-potential metal pattern 53 on the planarizing resin film 45 is patterned in the peripheral circuit portion B to have a size that covers the first-layer wirings 51, the second-layer wirings 52, and the high-frequency circuit portion 50. Also, the fixed-potential metal pattern 53 is connected electrically to the fixed-potential such as the ground potential GND or the like to thereby prevent the electromagnetic wave that is generated by the transmission of the high-frequency signal.

In addition, since the color resin film 12 is formed between the fixed-potential metal pattern 53 and the second-layer wirings 52, the parasitic capacitance between them is very small.

Figure 11A:
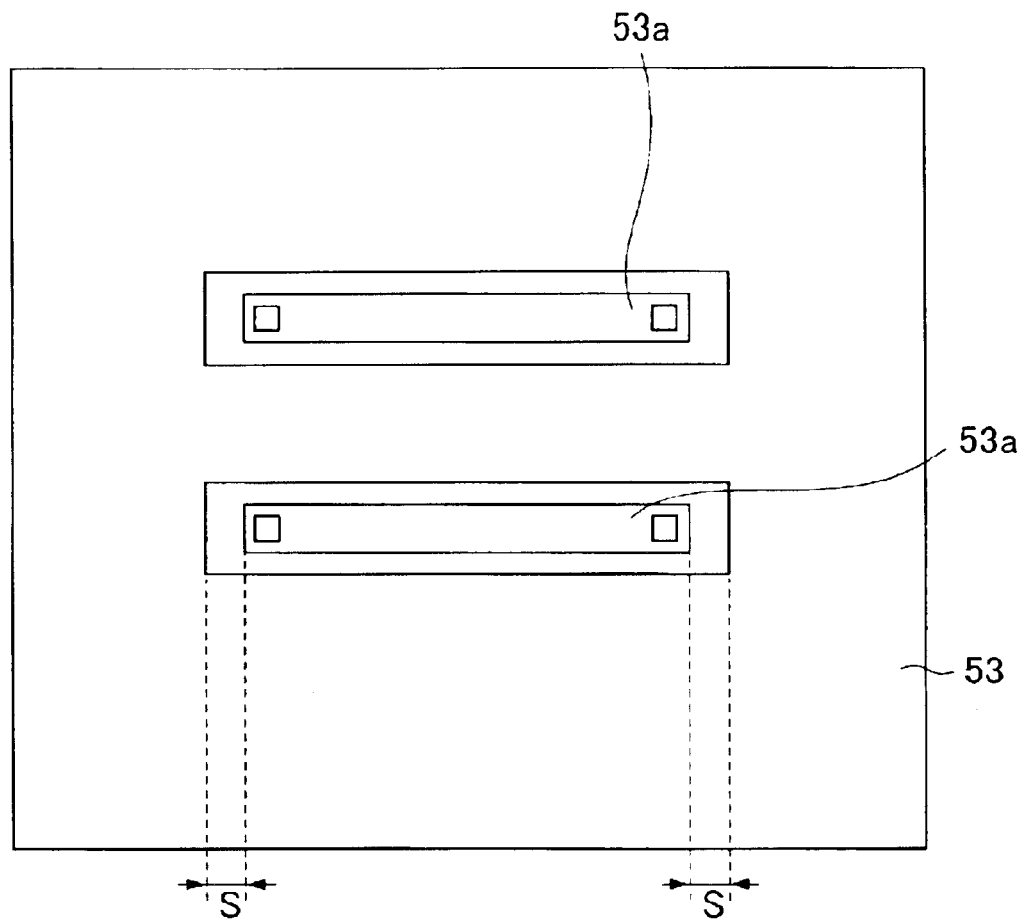
FIG. 11A is a plan view showing another high-frequency signal transmission circuit of the display device according to the fifth embodiment of the present invention.
Figure 11B:
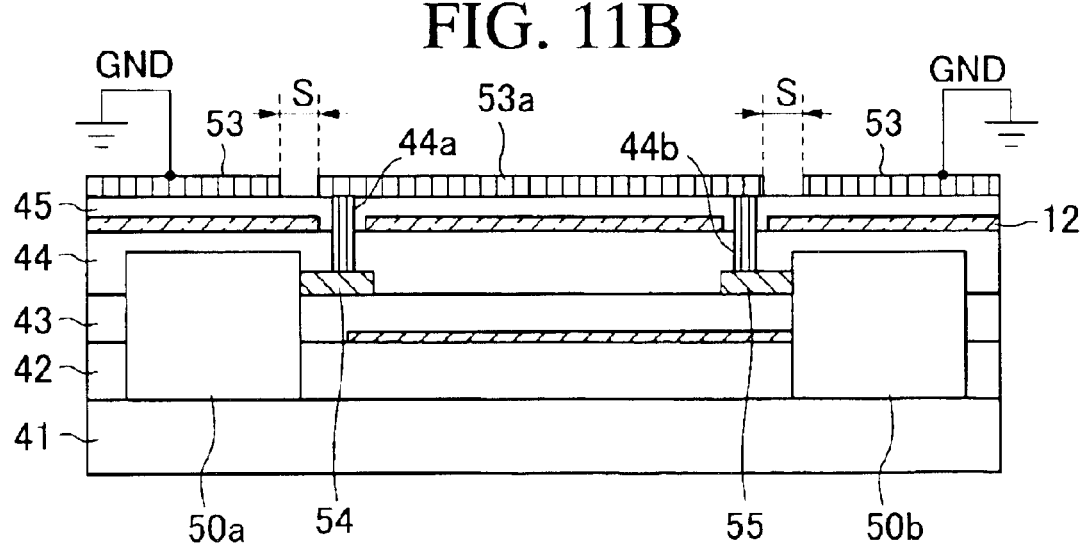
FIG. 11B is a sectional view showing the same.

FIG. 11A is a plan view showing a variation of the present embodiment, and FIG. 11B is a sectional view showing the same.

In FIGS. 11A and 11B, two high-frequency circuit portion 50a, 50b provided in the peripheral circuit formed on the TFT substrate are connected to a first terminal 54 and a second terminal 55 formed on the first interlayer insulating film 43 respectively. The first terminal 54 and the second terminal 55 are formed by patterning the second-layer metal layer, from which the second-layer wirings 52 are formed, respectively.

Also, the color resin film 12 is formed between the second interlayer insulating film 44 and the planarizing resin film 45. Then, a plurality of bridge wirings 53a are formed on the planarizing resin film 45 by patterning the third-layer metal film constituting the fixed-potential metal pattern 53. One ends of the bridge wirings 53a are connected to the first terminal 54 via holes 44a formed in the planarizing resin film 45 and the second interlayer insulating film 44, while the other ends of the bridge wirings 53a are connected to the second terminal 55 via another holes 44b formed in the second interlayer insulating film 44. Accordingly, two high-frequency circuit portion 50a, 50b are connected electrically via the first terminal 54, the second terminal 55, and the bridge wirings 53a.

Also, the fixed-potential metal pattern 53 that is patterned to have the size that covers the first-layer wirings 51, the second-layer wirings 52, and the high-frequency circuit portion 50a, 50b in the peripheral circuit portion B is connected electrically to the fixed potential such as the ground potential GND or the like.

In this case, a third-layer metal layer 53 is formed of the same third-layer metal layer to surround the bridge wirings 53a. Thus, the third-layer metal layer 53 is isolated mutually from the bridge wirings 53a by a clearance S of 3 to 50 μm.

In this case, there may be employed such a structure that elements in the same high-frequency circuit are connected by the wiring patterns that are formed by patterning the third-layer metal layer.

It is to be desired that, in order to get the, lower resistance value, the above third-layer metal layer should be formed of the metal layer containing the aluminum and that the sheet resistance should be designed below 10Ω/□. In the present embodiment, the metal layer having the double-layered structure consisting of a titanium film of 50 nm thickness and an aluminum film of 200 nm thickness is employed as the third-layer metal layer, and the sheet resistance of the metal layer having the double-layered structure is below 0.2Ω/□.

As described above, since the fixed-potential metal pattern 53 that is formed by patterning the third-layer metal layer on the planarizing resin film 45 is connected to the ground potential GND, the radiation of the electromagnetic wave caused by the high-frequency signal transmission wirings can be suppressed. As a result, the high-frequency circuit portion 50a, 50b can transmit the high-frequency signal without fail at a high S/N (Signal/Noise) ratio. In addition, since the electromagnetic wave radiation from the TFT substrate can be reduced by the fixed-potential metal pattern 53, the electromagnetic wave radiation of the overall information system can be reduced and thus the high-frequency transmission circuits having the above structure can contribute to the construction of the environmentally benign information system. Further, since the high-frequency transmission circuits having the above structure can prevent the electrical oscillation of the high-frequency circuit, the stability in the panel operation can be improved.

Also, since the planarizing resin film 45 and the color resin film 12 having the low dielectric constant are interposed between the high-frequency circuit portion 50a, 50b and the overlying bridge wirings 53a, the parasitic capacitance between them can be reduced to accelerate the high-speed operation. In addition, since the planarizing resin film 45 is lifted up by the color filters 12f in the display portion A and also the color resin film 12 constituting the color filters 12f still remains in the peripheral circuit portion B, the level difference is hard to occur between the display portion A and the peripheral circuit portion B because of the formation of the color resin film 12.

(Sixth Embodiment)

In the present embodiment, a liquid crystal display device that has a common electrode, which is formed of the third-layer metal film to have the low resistance value, on the TFT substrate will be explained hereunder.

Figure 12:
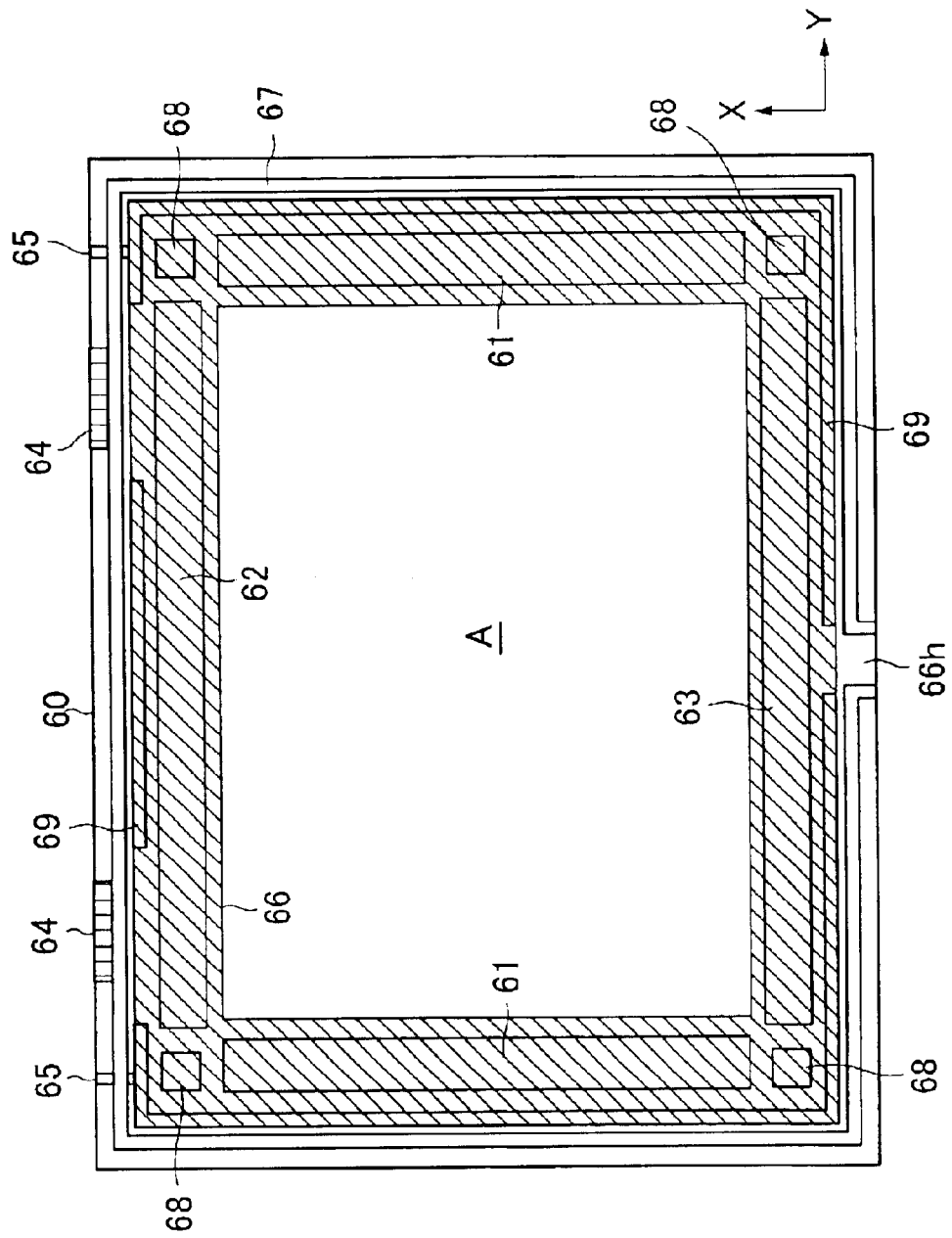
FIG. 12 is a plan view showing a connecting structure of a TFT substrate and an opposing substrate of a liquid crystal display device according to a sixth embodiment of the present invention.
Figure 13:
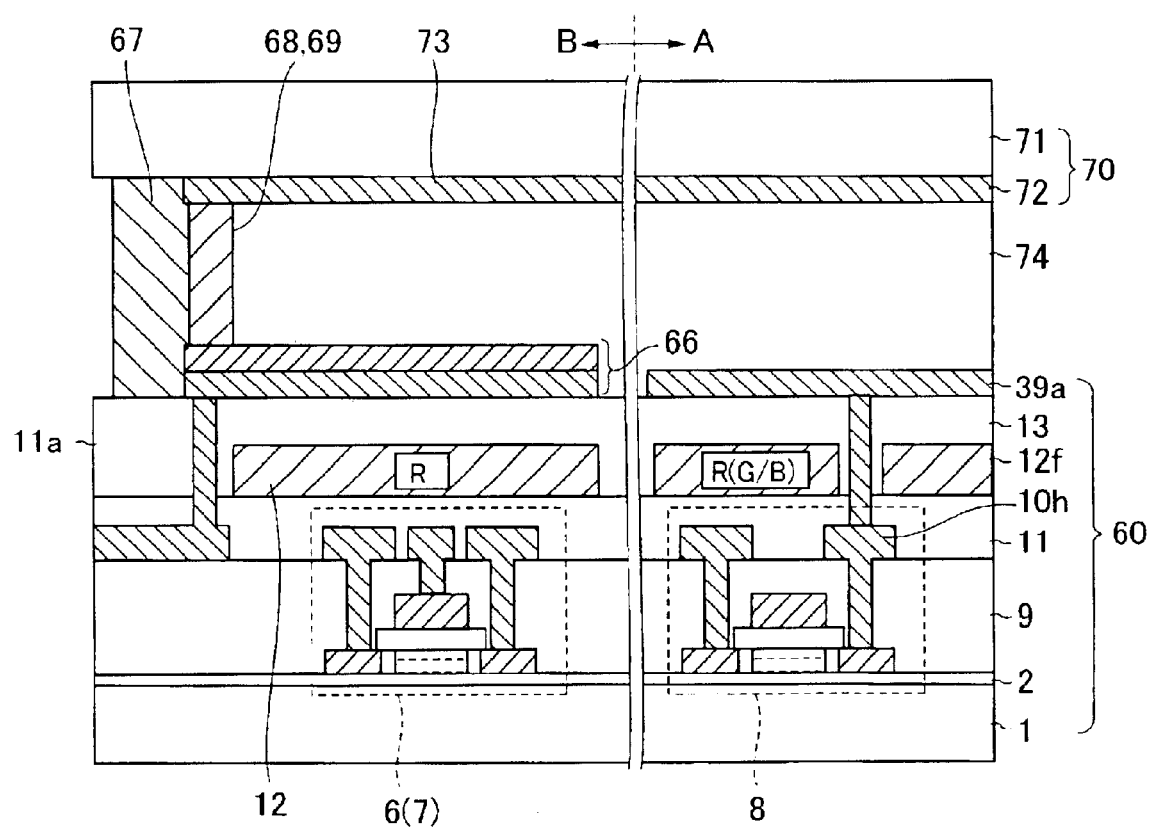
FIG. 13 is a partial sectional view showing the liquid crystal display device according to the sixth embodiment of the present invention.

FIG. 12 is a plan view showing a structure of a common electrode of the liquid crystal display device having the structure shown in the fourth embodiment. FIG. 13 is a sectional view taken along a III—III line in FIG. 12. In FIG. 12 and FIG. 13, the same symbols as those in the fourth embodiment denote the same elements.

On a TFT substrate 60 of the liquid crystal display device, pixel cells each having the pixel electrode 39a and the TFT 8 are formed in a matrix fashion in the display portion A in the center area, and gate-side peripheral circuits 61 are formed in the peripheral circuit portion B on right and left sides of the display portion A, and a data-side peripheral circuit 62 is formed on one end side of the display portion A. In addition, another peripheral circuit 63 is formed on the other end side of the display portion A.

Also, on the TFT substrate 60, panel terminals 64 and common electrode terminals 65 are formed on another end sides of the gate-side peripheral circuits 61. The panel terminals 64 and the common electrode terminals 65 are connected electrically to the gate-side peripheral circuits 61, the data-side peripheral circuit 62, etc.

Then, in the peripheral circuit portion B on the TFT substrate 60, a TFT-side transfer pad 66 that is also used as a light shielding film is formed by patterning the third-layer metal film. This TFT-side transfer pad 66 may be formed by either the fixed-potential metal pattern in the fifth embodiment or the double-layered structure consisting of the metal film and the transparent conductive film. In this case, as explained in the fourth embodiment, the TFT-side transfer pad 66 may be constructed by the third-layer metal film and the ITO film. Also, a part of the data-side peripheral circuit 62, the gate-side peripheral circuits 61, and another peripheral circuit 63 may be formed by patterning a part of the TFT-side transfer pad 66, as shown in FIG. 12.

In this case, one end, the other end, and right and left sides of the display portion A respond to concerned portions respectively in the situation that the viewer looks at the liquid crystal display device, and one end is the upper side of the display device and the other end of the display device is the lower side.

Also, like the above embodiments, on the TFT substrate, the color resin film 12 is formed between the planarizing resin film 13 and the silicon nitride film (second interlayer insulating film) 11 in the peripheral circuit portion B, and also the color filters 12f are formed in the display portion A.

As shown in FIG. 13, an opposing substrate 70 of the liquid crystal display device has a transmissive insulating substrate 71, an opposing electrode 72 made of ITO, and an opposite-side pad electrode 73 connected to the opposing electrode. The opposite-side pad electrode 73 may be formed of the ITO that is identical to the opposing electrode 72.

The opposing substrate 70 and the TFT substrate 60 are laminated via a seal 67 such that the opposing electrode 72 opposes to the TFT-side transfer pad 66. The seal 67 is formed on the TFT substrate 60 like a frame on the outside of the TFT-side transfer pad 66. The seal 67 has a liquid crystal injection port 66h on the other end side of the TFT substrate 60. Then, a liquid crystal 74 is introduced into a space between the opposing substrate 70 and the TFT substrate 60, which have been laminated, via the liquid crystal injection port 66h.

In this case, if the color resin film 12 is formed below the TFT-side transfer pad 66, it is preferable that the color resin film 12 should be removed from the underlying region of the seal 67. This is because it is possible that the color resin film 12 deteriorates the adhesiveness between the underlying silicon nitride film 11 and the overlying planarizing resin film 13.

The opposite-side pad electrode 73 on the opposing substrate 70 side and the TFT-side transfer pad 66 on the TFT substrate 60 side are connected via transfer conductors. As the transfer conductors, there are corner transfers 68 formed on the corners of the peripheral circuit portion B, and linear transfers 69 formed along outer edge portions of the TFT-side transfer pad 66. The transfer conductors 68, 69 are constructed by a conductive fiber, a spherical conductive past, a conductive column, or the like.

According to the linear transfers 69 formed along the peripheral circuit portion B, the contact area between the opposite-side pad electrode 73 and the TFT-side transfer pad 66 is widened, and thus the contact resistance and the wiring resistance can be reduced considerably. In this case, the forming positions of the linear transfers 69 can be selected arbitrarily in the peripheral circuit portion B.

Also, on the TFT substrate 60 side, the TFT-side transfer pad 66 and the common electrode terminals 65 are connected electrically via the holes 11a that are formed in the planarizing resin film 13 and the second interlayer insulating film 11. Therefore, the opposing electrode 72 on the opposing substrate 70 side can be led electrically to the common electrode terminals 65 via the transfer conductors 68, 69.

Figure 14:
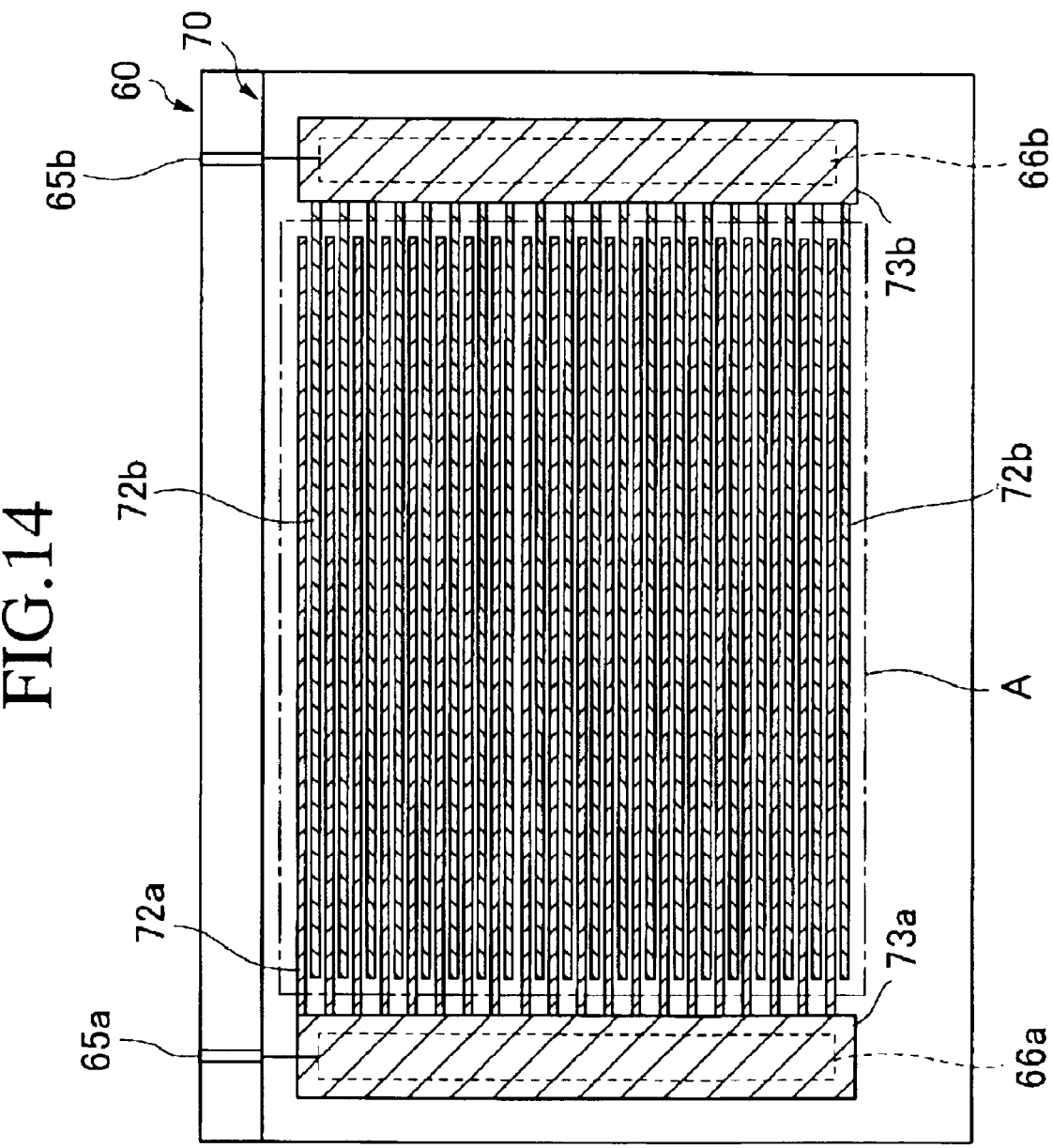
FIG. 14 is a plan view showing an example of shapes of opposing electrodes and TFT-side transfer pads in the liquid crystal display device according to the sixth embodiment of the present invention.

The opposing electrode 72 and the opposite-side pad electrode 73 on the opposing substrate 70 have a planar shape shown in FIG. 14, for example, respectively.

In FIG. 14, the opposing electrode 72 formed on the opposing substrate 70 is constructed by a plurality of stripe-like opposing electrodes that are arranged to oppose to a plurality of pixel cells formed on the TFT substrate 60. One pixel cell is constructed by one TFT 8 and one pixel electrode 39a.

Out of the pixel cell columns arranged in the horizontal direction, odd-numbered column opposing electrodes 72a, which oppose to the odd-numbered columns, and even-numbered column opposing electrodes 72b, which oppose to the even-numbered columns, are formed alternatively at an interval as the stripe-like opposing electrodes. In addition, the odd-numbered column opposing electrodes 72a are connected to a first opposite-side pad electrode 73a formed on the left side of the display portion A, and the even-numbered column opposing electrodes 72b are connected to a second opposite-side pad electrode 73b formed on the right side of the display portion A.

The first opposite-side pad electrode 73a is connected to a first TFT-side transfer pad 66a, which is formed on one side of the display portion A on the TFT substrate 60 side, via liner transfer conductors 69a. Also, the second opposite-side pad electrode 73b is connected to a second TFT-side transfer pad 66b, which is formed on the other side of the display portion A on the TFT substrate 60 side, via liner transfer conductors 69b.

The first TFT-side transfer pad 66a is connected electrically to a first common electrode terminal 65a, and the second TFT-side transfer pad 66b is connected electrically to a second common electrode terminal 65b.

According to the structure shown in FIG. 14, the contact areas between the TFT-side transfer pads 66a, 66b and the opposite-side pad electrodes 73a, 73b via the liner transfer conductors 69a, 69b respectively are widened rather than the prior art on both sides of the display portion A. As a result, the contact resistances and the wiring resistances between the TFT-side transfer pads 66a, 66b and the opposite-side pad electrodes 73a, 73b can be reduced considerably.

In this case, the opposing electrode that is different from that shown in FIG. 14 may be formed. For instance, although not shown, the stripe-like opposing electrodes may be formed on the odd-numbered columns and the even-numbered columns that correspond to a plurality of pixel columns arranged in the vertical direction, and then the stripe-like opposing electrodes on the odd-numbered columns may be connected to the upper opposite-side pad electrodes in the display portion A and also the stripe-like opposing electrodes on the even-numbered columns may be connected to the lower opposite-side pad electrodes in the display portion A.

In the present embodiment, there are further provided the transfer conductors 68, 69 connected electrically to the opposing electrode 72 on the opposing substrate 70, the first-layer metal layers 5b, 5c formed below the planarizing resin film 13 in the peripheral circuit portion B of the opposing substrate 70, the second-layer metal layers 10a to 10h, and the third-layer metal layer 66 having the shape that is formed on the planarizing resin film 13 and connected to the transfer conductors 68, 69.

(Seventh Embodiment)

Figure 15:
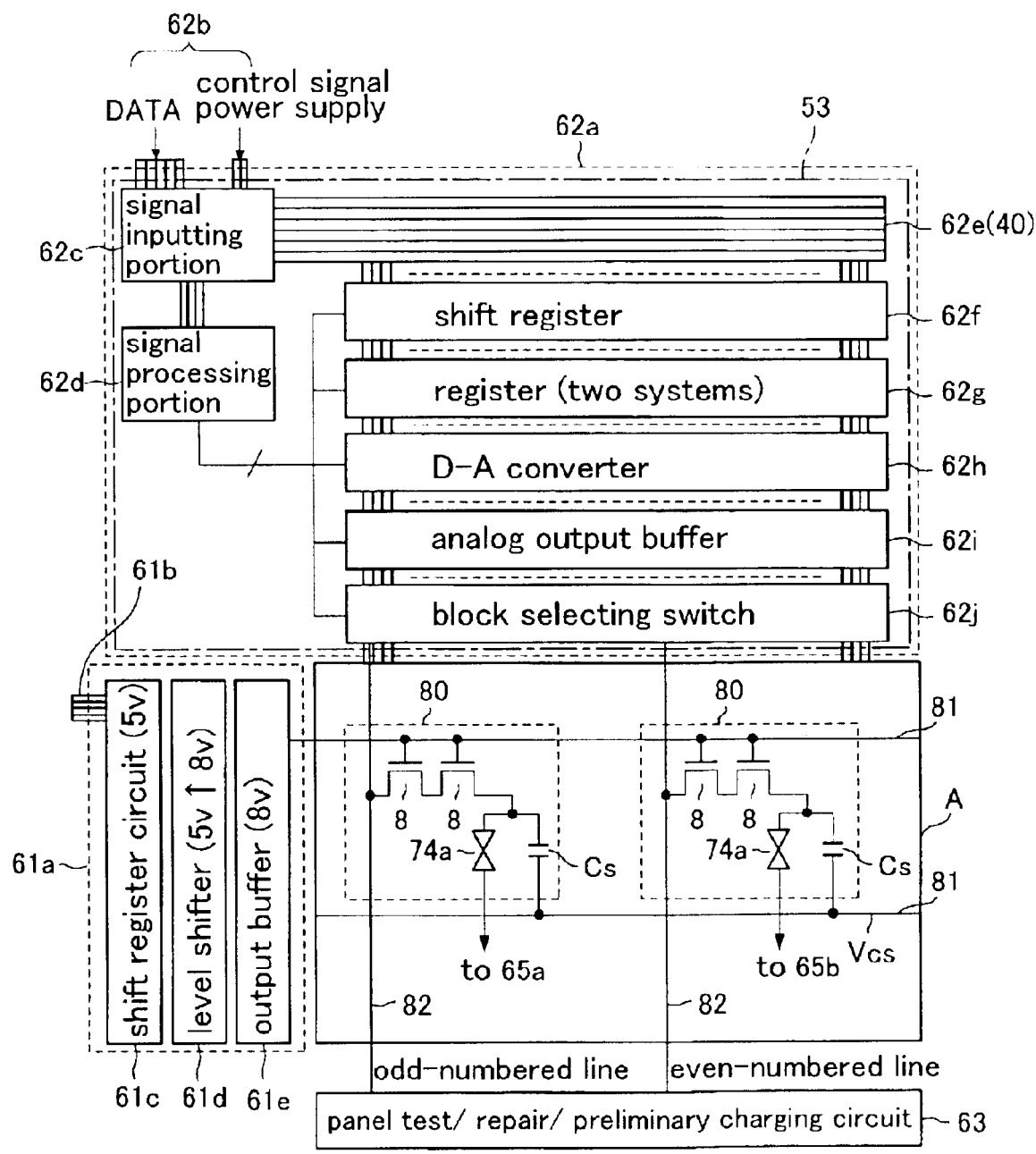
FIG. 15 is a circuit block diagram showing a display portion and a peripheral circuit portion of a liquid crystal display device according to a seventh embodiment of the present invention.
Figure 16:
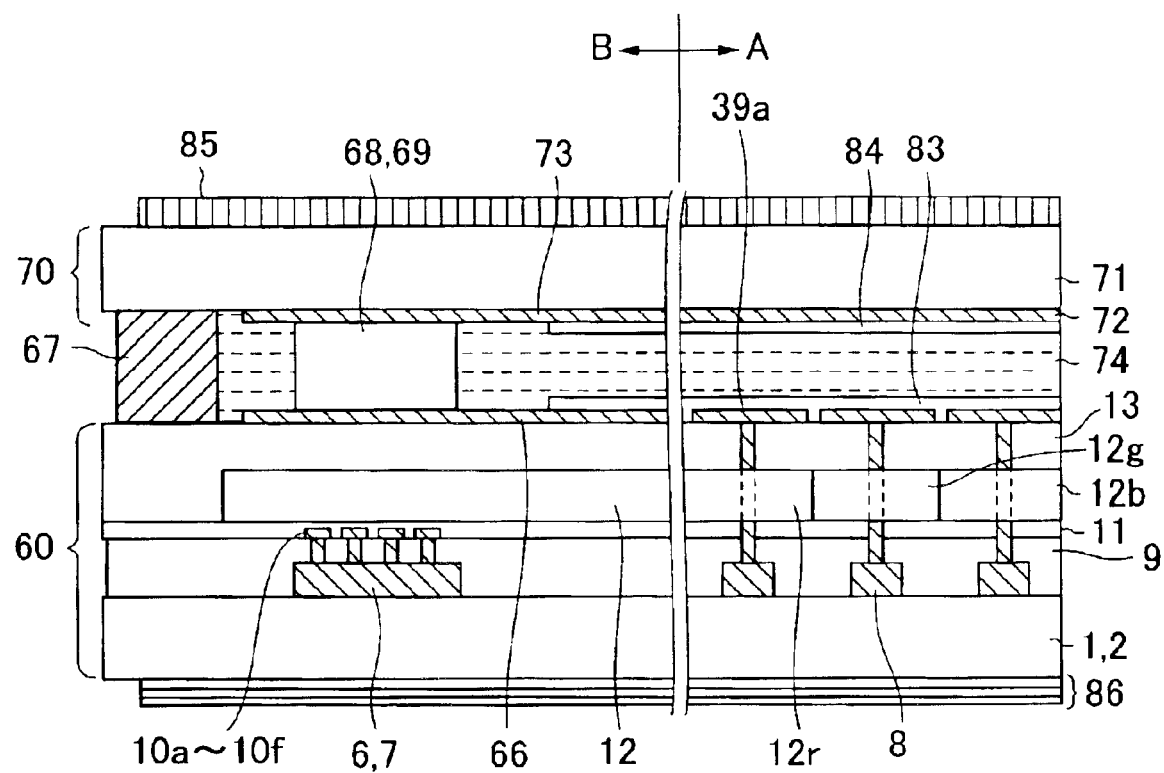
FIG. 16 is a partial sectional view showing the liquid crystal display device according to the seventh embodiment of the present invention.

FIG. 15 is a circuit diagram showing connections among a display portion, a data driver and a gate driver in a liquid crystal display device according to a seventh embodiment. This display device has the high-frequency signal transmission circuit and the electromagnetic wave shielding structure explained in the fifth embodiment and the low-resistance transfer structure shown in the sixth embodiment. FIG. 16 is a partial sectional view showing the liquid crystal display device according to the seventh embodiment. In FIG. 15 and FIG. 16, the same symbols as those in the above embodiments denote the same constituent elements.

In FIG. 15 and FIG. 16, like the first embodiment, the display portion A and the peripheral circuit B have the TFTs, which are formed at the low temperature, respectively.

The liquid crystal display device comprises the display portion A consisting of the pixel matrix, a data driver 62a as the data-side peripheral circuit 62 provided around the display portion A, and a gate driver 61a as the gate-side peripheral circuit 61 provided around the display portion A. The pixel matrix in the display portion A is constructed such that sub-pixel numbers of R, G, B are set to horizontal 4800× vertical 1200, for example, respectively.

On the insulating substrate 1, the display portion A has scanning lines (gate lines) 81 connected to the gate driver 61a, signal lines (data lines) 82 connected to the data driver 62a, and pixel cells (sub-pixels) 80 consisting of the TFTs and the pixels. A plurality of pixel cells 80 are arranged vertically and laterally over the insulating substrate 1 to constitute the pixel matrix. The other ends of the signal lines 82, one ends of which are connected to a block selecting switch 62j, are connected to another peripheral circuit 63 such as a panel test/repair/preliminary charging circuit.

The pixel cell 80 on the insulating substrate 1 side has two TFTs 8. The double gate structure, in which the source region 8a of one TFT 8 is connected to the drain region 8d of the other TFT 8 and their gate electrodes 8g are connected to the same scanning line 81, is employed. The pixel electrode 39a and an auxiliary capacitor Cs are connected to the source region 8s of the other TFT 8 that is not directly connected to the signal line 82.

The stripe-like opposing electrodes 72 that are extended in the vertical direction are formed on the opposing substrate 70 side. Then, one opposing electrode 72, one pixel electrode 39a, and the liquid crystal 74 sealed between them constitute one liquid crystal cell 74a. The liquid crystal cells 74a on the odd-numbered columns and the even-numbered columns are led electrically to any one of the first common electrode terminal 65a and the second common electrode terminal 65b, shown in FIG. 14, respectively.

The gate driver 61a shown in FIG. 15 is constructed by a gate-side input terminal 61b, a shift register 61c, a level shifter 61d, and an output buffer 61e. Since the operating voltage of the shift register 61c is 5 V and is identical to a signal level of an external driver circuit (not shown), the gate driver 61a acts as a easily-connectable interface. An output signal of the shift register 61c is raised up to 8V by the level shifter 61d, and then output to the scanning line 81 via the output buffer 61e.

The data driver 62a has a data-side input terminal 62b, a signal inputting portion 62c, a signal processing portion 62d, a video signal line 62e, a shift register 62f, a two-system register (latch) 62g, a D-A converter 62h, an analog output buffer 62i, and a block selecting switch 62j. The data-side input terminal 62b has data input terminals, and input terminals for the control signal, the power supply, etc. The data being input into the data input terminals are transmitted to the video signal line 62e via the signal inputting portion 62c, and fed sequentially to the signal line 82 in the display portion A via the shift register 62f and the block selecting switch 62j. Also, the control signal being input into the data-side input terminal 62b is fed to the signal processing portion 62d via the signal inputting portion 62c to control the shift register 62f, the two-system register 62g, the D-A converter 62h, the analog output buffer 62i, and the block selecting switch 62j.

In the present embodiment, the UXGA display format is employed and the data clock frequency is set to 162 MHz. The display signals (data) and the control signal being supplied from the personal computer are input into a panel control plate (PT plate) via the TMDS serial port (not shown) and then converted into the 8-bit digital signal by the TMDS receiver (not shown). The clock frequency of the panel is different based on the number of data input signals, i.e., the video signal lines. For example, if 8-bit data for one pixel (one RGB pixel) are input by one clock, the video signal lines of 8×3=24 are needed and the clock frequency is 80 MHz. Thus, if the data for four pixels are input, the number of the video signal lines is 96 and the clock frequency is 40 MHz.

In the present embodiment, since the 96 video signal lines are employed, the clock frequency is set to 40 MHz. Also, the amplitude of the data input signal is set to 5 V. Since the common inversion is employed, the level of the data signal can be lowered to about 5 V when the 5-V liquid crystal is employed. Thus, the power consumption of the panel can be reduced considerably.

The high-frequency signal transmission circuit 40 constructed by the metal wiring having the triple-layered structure shown in the fifth embodiment is employed as the video signal lines in the data driver 62a. The fixed-potential metal pattern 53 is formed over the signal inputting portion 62c, the shift register 62f, etc. as the electromagnetic radiation preventing structure made of the third-layer metal film. Since the details are explained in the fifth embodiment, further explanation will be omitted herein.

FIG. 16 shows the panel section of the display device of the present embodiment. In the peripheral circuit portion B, the transfer structures explained in the fifth embodiment are employed. That is, the TFT-side transfer pad 66 also used as the light shielding film and made of the third-layer metal film is formed and then this TFT-side transfer pad 66 is connected to the opposite-side pad electrode 73 on the opposing substrate 70 via the transfer conductors 68, 69, so that the TFT-side transfer pad 66 and the opposing electrode 72 on the opposing substrate 70 side are connected electrically to the common electrode terminals 65. In this case, the TFT-side transfer pad 66 may be formed of the transparent conductive film.

Also, the red, green, blue color filters 12r, 12g, 12b are formed between the planarizing resin film 13 and the TFTs 6 to 8 in the display portion A, while the red color resin film 12 constituting the color filters 12r, 12g, 12b, e.g., the red color resin film 12, is left between the planarizing resin film 13 and the TFTs 6 to 8 in the peripheral circuit portion B. In this case, in order to prevent the degradation of the adhesiveness between the seal 67 and the second interlayer insulating film 11, the color resin film 12 is not left under the seal 67.

An alignment film 83 for covering the pixel electrodes 39a is formed in the display portion A on the TFT substrate 60, while an alignment film 84 for covering the opposing electrode 72 is formed on the opposing substrate 70. These alignment films 83, 84 may be extended into a part of the peripheral circuit portion B.

In this case, a first optical film 85 such as a polarization plate, or the like is formed on a surface of the transparent insulating substrate 71 in the opposing substrate 70, which is opposite to the opposing electrode 72. Also, a second optical film 86 such as the polarization plate, or the like is formed on a surface of the insulating substrate 1 in the TFT substrate 60, which is opposite to the TFTs 6 to 8.

According to the present embodiment, the panel in which the peripheral circuit portion B, which can execute a stable operation at the high frequency, and the display portion A are formed integrally can be achieved. Also, the high-performance/low-power-consumption liquid crystal display panel in which the common electrodes are driven inversely can be attained by reducing the resistance of the common electrode terminals 65 and the transfer structures 66, 68, 69, 73.

In addition, since the color resin film 12 is still left in the peripheral circuit portion B, the parasitic capacitance between the second-layer wiring patterns 10a to 10f and the third-layer metal film 66 can be reduced in the peripheral circuit portion B.

In the liquid crystal display device of the present embodiment, there may be provided the first-layer metal layer 5b, 5c and the second-layer metal layer 10a to 10f formed under the planarizing resin film 13 in the peripheral circuit portion B of the insulating substrate 1, and the third-layer metal layer 66 formed on the planarizing resin film 13 in the peripheral circuit portion B in connection with the structure of the peripheral circuit portion B.

Also, in the display device of the present embodiment, there may be provided the first-layer metal layer 5b, 5c and the second-layer metal layer 10a to 10f formed under the planarizing resin film 13 in the peripheral circuit portion B of the insulating substrate 1, and the third-layer metal layer 66 formed on the planarizing resin film 13 to have the shape that can shield the peripheral circuit portion B from the light.

Also, in the display device of the present embodiment, there may be provided the first-layer metal layer 5b, 5c and the second-layer metal layer 10a to 10f formed under the planarizing resin film 13 in the peripheral circuit portion B of the insulating substrate 1, and the third-layer metal layer 66 formed on the planarizing resin film 13 to have the shape that can shield the peripheral circuit portion B from the electromagnetic wave.

In the above embodiments, even if not particularly shown, the third-layer metal layer is formed of any one of the single-layer metal film, the multi-layered metal film, the multi-layered film containing the transparent conductive film.

As described above, according to the liquid crystal display device of the present invention, the color resin film constituting the color filters formed in the display portion is also formed in the peripheral circuit portion. Therefore, the parasitic capacitance between upper and lower conductive patterns can be reduced by the color resin in the peripheral circuit portion.

Also, since the color resin film is left in not only the display portion but also the peripheral circuit portion, the difference between the gap between the first substrate and the second substrate in the peripheral circuit portion and the gap between the first substrate and the second substrate in the display portion can be reduced. Therefore, the waste of the liquid crystal can be reduced by reducing an amount of supply of the liquid crystal into the peripheral circuit portion.

In addition, the color resin film in the peripheral circuit portion can be formed by leaving as it is the color resin film employed as the color filters. Therefore, the addition of steps is not needed newly and thus the reduction in throughput can be avoided.

What is claimed is:

1. A liquid crystal display device manufacturing method, comprising the steps of:

forming first-layer metal patterns in a display portion and a peripheral circuit portion of a first substrate;

forming a first insulating film on the first-layer metal patterns;

forming second-layer metal patterns on the first insulating film;

forming a color resin film on the second-layer metal patterns;

patterning the color resin film to form color filters made of the color resin film in a pixel region of the display portion and to leave the color resin film in the peripheral circuit portion; and forming a third-layer metal pattern on the color resin film in the peripheral circuit portion.

2. A liquid crystal display device manufacturing method according to claim 1, wherein the color resin film being left in the peripheral circuit portion is at least a red-colored film.

3. A liquid crystal display device manufacturing method according to claim 1, further comprising the step of:

forming a second insulating film between the second-layer metal patterns and the color resin film.

4. A liquid crystal display device manufacturing method according to claim 1, further comprising the step of:

forming a planarizing resin film between the color resin film and the color filters and the third-layer metal pattern.

* * * * *